(12) United States Patent
Vinodkrishnan et al.

(10) Patent No.: US 7,213,233 B1
(45) Date of Patent: May 1, 2007

(54) MODELING STANDARDS VALIDATION TOOL FOR USE IN ENTERPRISE ARCHITECTURE MODELING

(75) Inventors: Nalledath P. Vinodkrishnan, Overland Park, KS (US); Lavanya Srinivasan, Overland Park, KS (US); Thomas C. Gifford, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 742 days.

(21) Appl. No.: 10/329,436

(22) Filed: Dec. 26, 2002

Related U.S. Application Data

(60) Provisional application No. 60/404,824, filed on Aug. 19, 2002.

(51) Int. Cl.
G06F 9/44 (2006.01)
(52) U.S. Cl. .................. 717/124; 717/127; 717/134; 719/328
(58) Field of Classification Search ................ 717/108, 717/124–127, 133; 719/328
See application file for complete search history.

(56) References Cited

U.S. PATENT DOCUMENTS

| | | | | |
|---|---|---|---|---|
| 5,129,086 A | * | 7/1992 | Coyle et al. ................. | 719/328 |
| 5,848,273 A | * | 12/1998 | Fontana et al. ............. | 717/108 |
| 5,941,978 A | * | 8/1999 | Finni ........................... | 712/28 |
| 6,023,580 A | * | 2/2000 | Sifter .......................... | 717/124 |
| 6,138,121 A | * | 10/2000 | Costa et al. ................. | 707/100 |
| 6,334,158 B1 | * | 12/2001 | Jennyc et al. ............... | 719/328 |
| 6,427,230 B1 | * | 7/2002 | Goiffon et al. .............. | 717/108 |
| 6,505,342 B1 | * | 1/2003 | Hartmann et al. .......... | 717/104 |
| 6,687,735 B1 | * | 2/2004 | Logston et al. ............. | 709/203 |
| 6,701,514 B1 | * | 3/2004 | Haswell et al. ............. | 717/115 |
| 6,807,583 B2 | * | 10/2004 | Hrischuk et al. ........... | 719/318 |
| 6,907,546 B1 | * | 6/2005 | Haswell et al. ............. | 714/38 |
| 6,986,124 B1 | * | 1/2006 | Field et al. .................. | 717/124 |
| 7,032,229 B1 | * | 4/2006 | Flores et al. ................ | 719/328 |
| 7,039,900 B2 | * | 5/2006 | Lecerf ......................... | 717/116 |
| 7,086,066 B2 | * | 8/2006 | Kappel et al. .............. | 719/318 |

OTHER PUBLICATIONS

Unified Modeling Language UML, Booch & OMT Quick Reference for Rational Rose 4.0, 1996.*
SNAP Foundation Template, Using the SNAP Permanent Storage Component, Template Software, Chapter 1-4.*
SNAP Foundation Template Using the SNAP Development Environment, Template Software, 1998, Chapter 1-7.*

(Continued)

*Primary Examiner*—Todd Ingberg

(57) ABSTRACT

A device for modeling an integrated enterprise includes a first tool for constructing a model of the integrated enterprise and a second tool which validates compliance of documents constructed by the first tool with a set of standards. The documents which may be constructed by the first tool include an analysis interface control document ("ICD") and a design ICD document. The second tool may then be used to selectively compare either the analysis ICD or the design ICD with selected ICD standards and generate an analysis ICD document standards exception report and a design ICD document standards exception report, respectively, which lists each variation of the analysis and design ICD documents from the selected ICD standards. The analysis and/or design ICD standards exception reports may subsequently be used as guides to correct errors in the analysis and/or design ICD documents causing the exceptions.

20 Claims, 16 Drawing Sheets

OTHER PUBLICATIONS

Inside CORBA Distributed Object Standards and Applications, Thomas J. Mowbray et al, 1997, p. 251.*

A UML testing Framework, Martin Fowler, Apr. 1999, 7 pages.*

ADL—An Interface Definition Language for Specifying and Testing Software, Siram Sankar et al, Sun, 1994.*

Lavanya Srinivasan, et al., *Inter-Application Validation Tool for use in Enterprise Architecture Modeling*, Filing Date—Nov. 2, 2002. U.S. Appl. No. 10/285,938, Specification (38 pgs.) and Drawings (6 sheets).

Nalledath P. Vinodkrishnan, et al., *Analysis Data Validation Tool for use in Enterprise Architecture Modeling*, Filing Date—Nov. 1, 2002, U.S. Appl. No. 10/286,526, Specification (46 pgs). and Drawings (9 sheets).

Nalledath P. Vinodkrishnan, et al., *Design Data Validation Tool for use in Enterprise Architecture Modeling*, Filing Date—May 8, 2003, U.S. Appl. No. 10/431,773, Specification (37 pgs). and Drawings (7 sheets).

Lavanya Srinivasan, et al., *Data Validation Tool for Enterprise Architecture*, Filing Date—Aug. 7, 2003, U.S. Appl. No. 10/636,121, Specification (43 pgs.) and Drawings 16 sheets).

Lavanya Srinivasan, et al., *Test Integration Tool*, Filing Date—Oct. 15, 2003, U.S. Appl. No. 10/686,422, Specification (25 pgs.) and Drawings (11 sheets).

\* cited by examiner

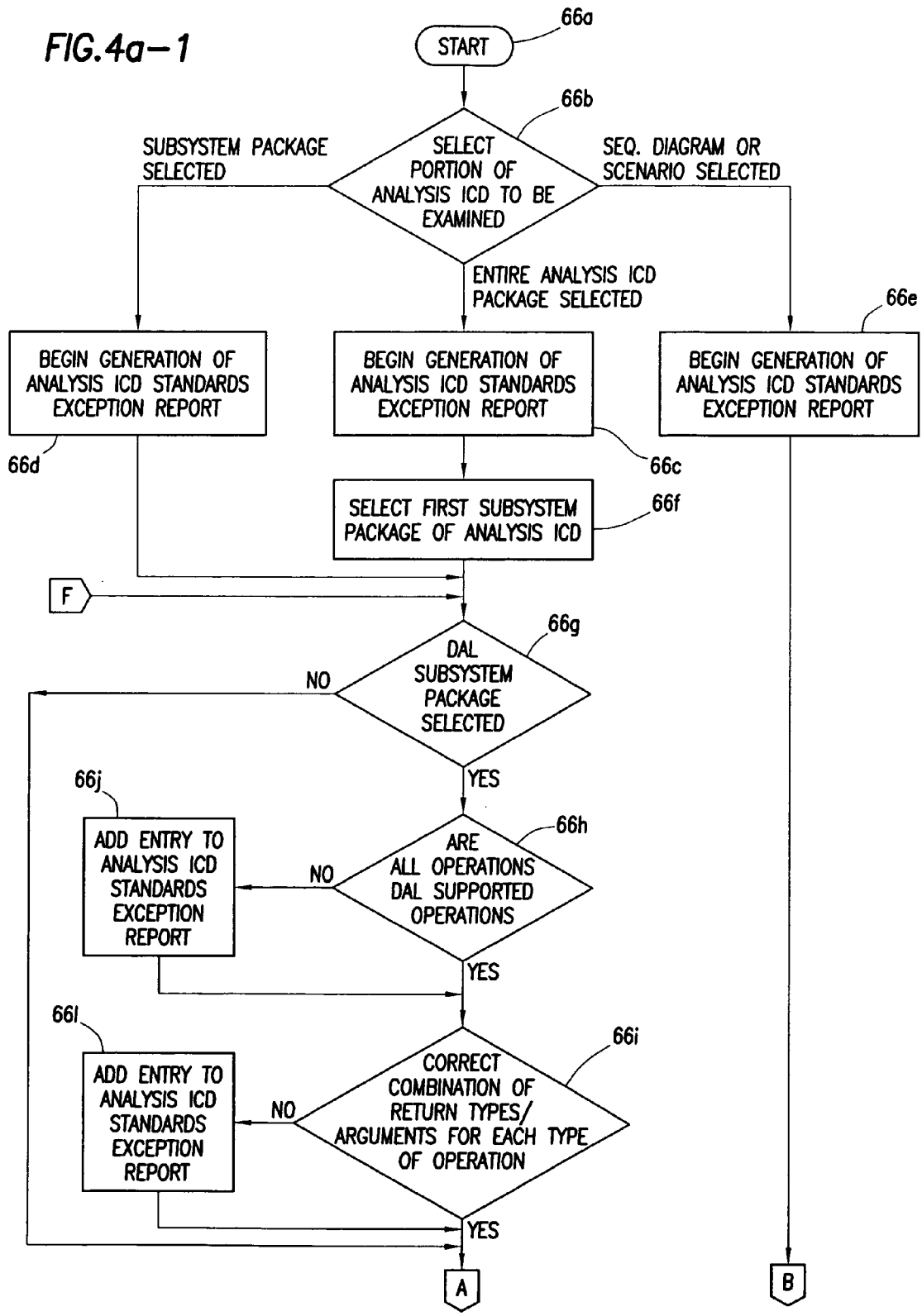

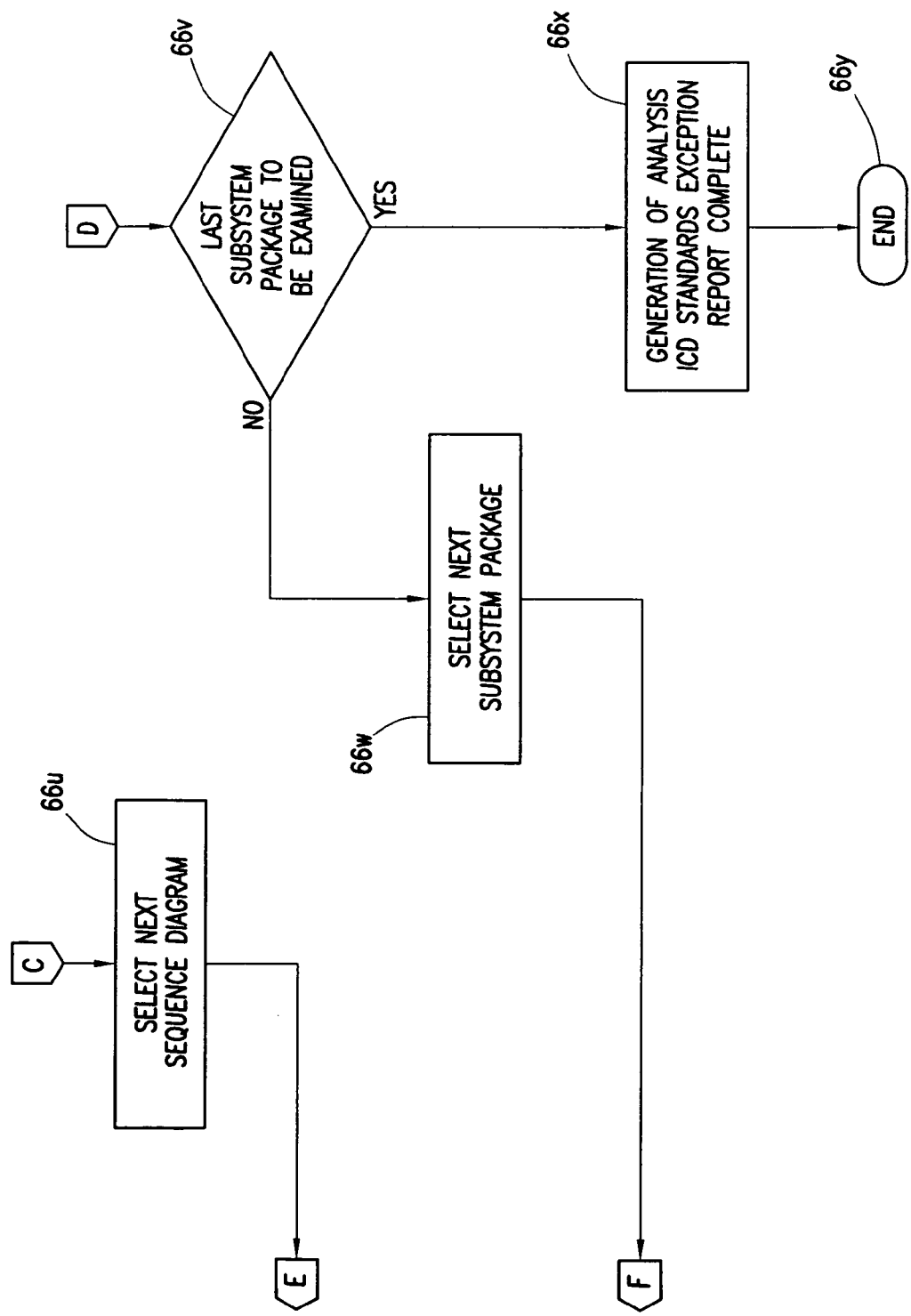

| Standards Validator Exceptions Report | | | | |
|---|---|---|---|---|
| C:\AIMWork\C4207-FSA-Restart\Customer Acquisition\OrderCapture_FSA.mdl | | | | |
| | | | | |
| Module | Class | Stereotype | Operation/Attribute/A | Error Description |
| Analysis D | FSA | No stereotype given | | This category needs a stereotype=subsyst |
| _CB | CB | | create IP Admin Orde | Operation not used in sequence diagram |
| _CB | CB | | delete IP Admin Id | Operation not used in sequence diagram |
| DAL | DAL | | created CancelOrderD | Invalid Operation-Refer to configuration file |
| DAL | DAL | | created CancelOrderD | This operation needs a StorageType as a pa |

MODELING STANDARDS VALIDATION TOOL FOR USE IN ENTERPRISE ARCHITECTURE MODELING

CROSS-REFERENCE TO RELATED APPLICATION

This application is related to U.S. Provisional Application Ser. No. 60/404,824, filed Aug. 19, 2002 and entitled "Enterprise Architecture Development Process."

This application is also related to U.S. patent application Ser. No. 10/286,526 entitled "An Analysis Data Validation Tool For Use In Enterprise Architecture Modeling", Ser. No. 10/285,938 entitled "An Inter-Application Validation Tool For Use In Enterprise Architecture Modeling" and Ser. No. 10/285,884 entitled "Data Integration Techniques For Use In Enterprise Architecture Modeling," all of which were filed on Nov. 1, 2002, assigned to the Assignee of the present application and hereby incorporated by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The invention is directed to a modeling standards validation tool suitable for use in enterprise architecture modeling. By analyzing a model to determine its compliance with a previously determined set of standards, the modeling standards validation tool may be used to identify errors occurring during construction of the model.

BACKGROUND OF THE INVENTION

The rapid evolution of computer and communication technologies coupled with the robust economies of the 1980s and 1990s resulted in unprecedented growth in the information technology ("IT") field. During this period, the need to establish a competitive advantage drove companies to faster and faster rates of change to support new product offerings and expanded services. As a result of these market pressures and time constraints, most companies elected to support new products and services by adding additional back office systems. However, due to the lack of mature integration technologies, the new systems were connected to the existing IT systems by making direct connections to the software routines already in use. The vulnerability of this design is that a change in one system produces a "ripple effect" change in every system it connects with. Over time, this incremental stacking of software systems can result in an integration ceiling. That is, at a certain point, more effort is spent on the connections than on new functionality and further expansion becomes cost prohibitive.

In the late 1990s, new integration technologies emerged that made it possible to "loosely couple" applications so that systems are no longer directly connected. Thus, changes in one system would not cause a ripple effect in any other systems. The most notable of these technologies are Message Oriented Middleware ("MOM"), Publish and Subscribe messaging, and Object Request Brokers ("ORBs"). These technologies enabled companies to re-architect their conglomeration of systems into an architecture that allows them to expand in a cost-effective manner. Technologies such as these that address the problem of integrating existing systems with new systems in an organized, efficient, and economically scaleable manner can be referred to collectively as enterprise application integration ("EAI") technologies.

An integrated enterprise may have any number of applications which interact with one or more shared databases (also referred to as an integrated information store ("IIS")) of the integrated enterprise through a data access layer ("DAL"). Among other things, interface control documents ("ICDs") for an integrated enterprise describes all of the application-to-database operations taking place within the integrated enterprise. The ICDs for the integrated enterprise should describe all of these operations using a pre-defined set of standards. Otherwise, the various relationships between the applications and the IIS would be unclear and, when tested, the integrated enterprise would likely suffer from any number of system errors.

Traditionally, errors resulting when the ICD is written in violation of the standards governing the document could only be identified through a detailed manual examination of the ICD documents which model an enterprise. Depending on the complexity of the integrated enterprise being modeled, such a task can be both difficult and time consuming. It is, therefore, the object of this invention to provide a tool which simplifies this task of identifying such errors.

SUMMARY OF THE INVENTION

In one embodiment, the present invention is directed to a method of establishing compliance of a model of an integrated enterprise with a set of standards. In accordance with the method, exceptions between the model and the set of standards are first identified. If no exceptions between the model of the integrated enterprise and the set of standards are identified, it is determined that the model of the integrated enterprise is in compliance with the set of standards. If, however, one or more exceptions between the model of the integrated enterprise and the set of standards are identified, the model of the integrated enterprise is revised to correct the identified exceptions. In certain aspects thereof, the model of the integrated enterprise may include an analysis ICD, a design ICD or both. For those aspects which include an analysis ICD, the method includes identifying exceptions between the analysis ICD of the model of the integrated enterprise and the set of standards. Similarly, for those aspects which include a design ICD, the method includes identifying exceptions between the design ICD of the model of the integrated enterprise and the set of standards. In further aspects of those aspects which include an analysis ICD, a report listing the identified exceptions between the analysis ICD of the model of the integrated enterprise and the set of standards is generated. The report is subsequently used as a guide when revising the analysis ICD. Similarly, in further aspects of those aspects which include a design ICD, a report listing the identified exceptions between the design ICD of the model of the integrated enterprise and the set of standards is generated. The report is subsequently used as a guide when revising the design ICD.

In another aspect of the aforementioned embodiment of the invention, operations interfacing a data access layer and an application of the integrated enterprise are identified and an exception is identified for each operation which is not supported by the set of standards. In another aspect thereof, the set of standards support only the CREATE, RETRIEVE, UPDATE and DELETE operations for those interfaces between the application and the data access layer. In still another aspect thereof, an exception is identified for each CREATE, UPDATE or return from a RETRIEVE operation lacking a storage type and for each RETRIEVE or DELETE operation lacking a key. The model of the integrated enterprise may further include sequence diagrams which depict operations which interface applications and/or the data access layer of the integrated enterprise. In certain aspects of the aforementioned embodiment of the invention, an exception is identified for each operation not used at least once in sequence diagrams which depict the operation. Each such sequence diagram includes plural calls, each including an object and a message. In certain further aspects thereof, an exception is identified for each object of a call not associated with one of the at least two applications and for each message of a call not associated with an operation.

In yet another aspect of the aforementioned embodiment of the invention, a first data access layer package which details the interface between the at least two applications and the data access layer and at least one subsystem package which details the interfaces between the at least two applications are identified. Exceptions within the first data access layer package are identified by applying a first set of rules to the first data access layer package and subsequently identifying an exception for each violation, by the first data access layer package, of the first set of rules. Similarly, exceptions within the at least one subsystem package are identified by applying a second set of rules to the at least one subsystem package and identifying an exception for each violation, by the at least one subsystem package, of the second set of rule. In a still further aspect thereof, the second set of rules used to identify exceptions in the subsystem packages is a subset of the first set of rules used to identify exceptions in the data access layer package. In another aspect thereof, a second data access layer which details the interface between the at least two applications and the shared database is also identified. Exceptions within the second data access layer package are identified by applying a third set of rules to the second data access layer package and subsequently identifying an exception for each violation, by the second data access layer package, of the third set of rules.

In another embodiment, the present invention is directed to a device for validating a model of an integrated enterprise which includes first and second applications and a shared database. The device includes a unified modeling language tool for constructing a model of the integrated enterprise and a tool for analyzing the model of the integrated enterprise by identifying exceptions between the model of the integrated enterprise and a set of standards. In one aspect thereof, the model analyzing tool generates a standard exception report identifying violations, by the model, of the set of standards. In another aspect thereof, the tool includes memory means for storing a selected portion of the set of standards and processor means for comparing the model of the integrated enterprise to the selected portion of the set of standards stored in the memory means. In still another, the memory means includes a first area in which a first subset of the selected portion of the set of standards are stored and a second memory area in which a second subset of the selected portion of the set of standards are stored. The first subset of the set of standards are for application against a first interface control document detailing the interface between the at least two applications and a data access layer of the integrated enterprise while the second subset of the set of standards are for application against a second interface control document detailing the interface between the at least two applications and the shared database.

DESCRIPTION OF DRAWINGS

FIG. 9 is an illustration of a portion of an analysis ICD standards exception report generated for the analysis package of FIG. 6.

DETAILED DESCRIPTION OF THE INVENTION

Figure 1:
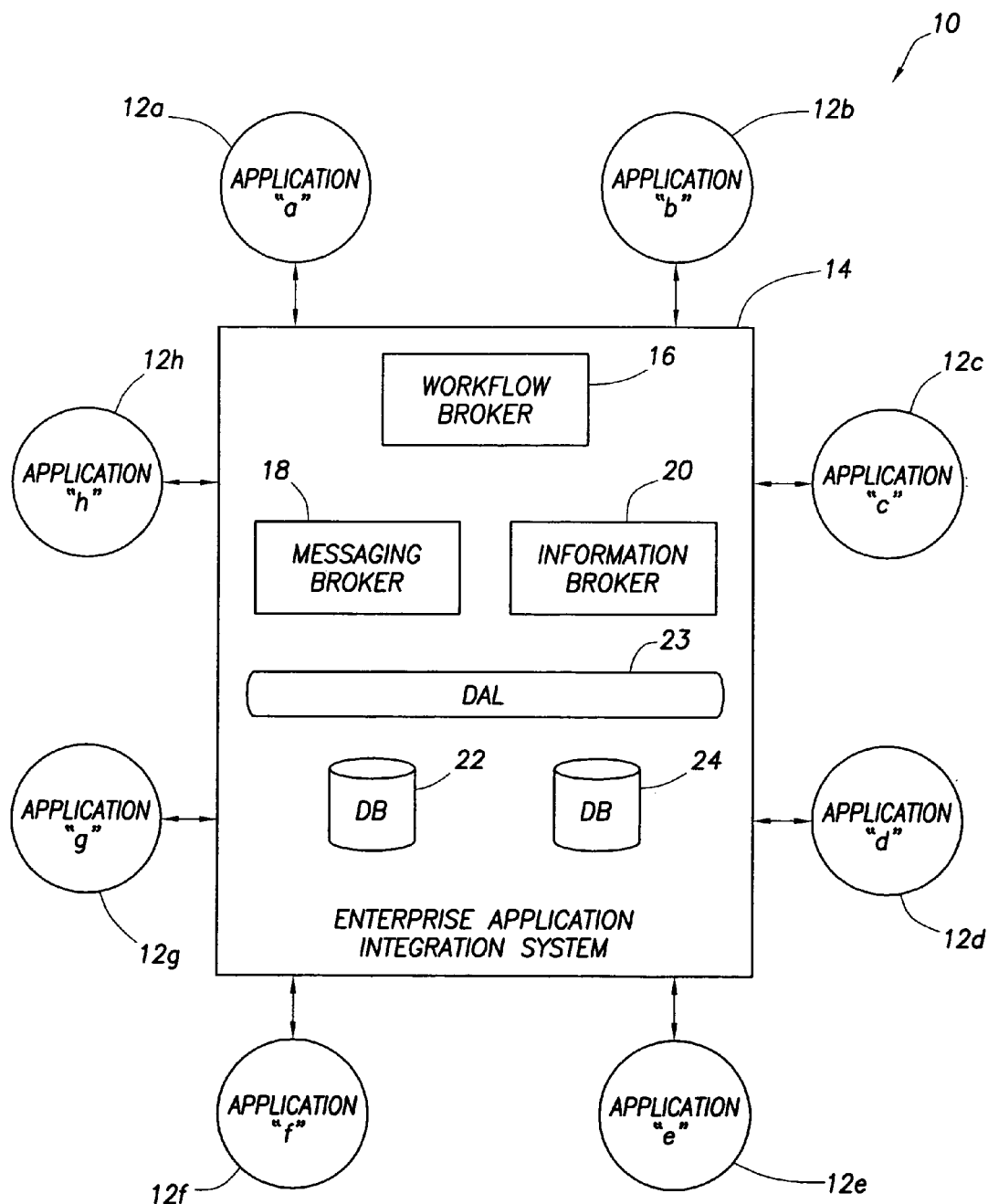
FIG. 1 is a block diagram of an integrated enterprise.

Referring first to FIG. 1, an integrated enterprise 10 will now be described in greater detail. As may now be seen, plural applications have been integrated into the integrated enterprise 10 by an EAI system 14. In the embodiment of the invention disclosed herein, a first application 12a, a second application 12b, a third application 12c, a fourth application 12d, a fifth application 12e, a sixth application 12f, a seventh application 12g and an eighth application 12h have all been integrated into the integrated enterprise 10. It should be clearly understood, however, that any number of applications may be integrated into the integrated enterprise 10. Once integrated into the integrated enterprise 10, any of the applications 12a through 12f may exchange messages with any of the other applications integrated into the integrated enterprise 10 or access any of the databases shared by the integrated enterprise 10. As illustrated in FIG. 1, a first database 22 and a second database 24 are shared by the integrated enterprise 10. Of course, it is fully contemplated that any number of databases ("DBs") may be shared by the integrated enterprise 10. Furthermore, while FIG. 1 shows the integrated enterprise 10 as being comprised of plural applications and plural databases integrated together by the EAI system 14, it is fully contemplated that a wide variety of other types of devices may be integrated into, and form part of, the integrated enterprise 10.

The EAI system 14 includes plural components which collectively enable integration of the integrated enterprise 10 so that the aforementioned inter-application exchange of messages and/or access of shared databases may be conducted. The components of the EAI system 14 which enable such exchanges and/or accesses include a workflow broker ("WB") 16, a messaging broker 18 and an information broker ("IB") 20. While a complete description of the operation of the workflow broker 16, the messaging broker 18 and the information broker 20 is beyond the scope of this application, briefly, using a set of pervasive services (not shown), the workflow broker 16, the messaging broker 18 and the information broker 20 implement specific business logic to integrate the enterprise 10. More specifically, the messaging broker 18 enables system integration at either the application level (the applications 12a through 12f) or the database level (the shared databases 22 and 24). Once an event is defined, or "published", in a source system, other systems interested in that event can "subscribe" to the published event. The messaging broker 18 then attends to delivery of event messages to subscribing systems.

The workflow broker 16 is responsible for process integration and enables business automation capabilities. To initiate work, an application, for example, the application 12a, interfaces with the workflow broker 16 through the messaging broker 18. Finally, the information broker 20 abstracts systems from the shared databases 22 and 24. On one end, the information broker 20 attaches itself to a logical data structure, more specifically, data access layer ("DAL") 23, within the shared databases 22 and 24 and, on the other end, exposes interfaces to systems that require data to be persisted to disparate databases. In this manner, the information broker 20 provides an efficient mechanism for applications, for example, the applications 12a through 12f, to access the shared databases 22 and 24. Of course, it should be clearly understood that the foregoing description of the workflow broker 16, the messaging broker 18 and the information broker 20 has been greatly simplified for ease of understanding. It should be further understood that, as described and illustrated herein, the EAI system 14 has been greatly simplified in that other components of the EAI system 14 which, like the workflow broker 16, the messaging broker 18 and the information broker 20, contribute to the integration of the enterprise 10 have been omitted from the drawing for ease of description.

Figure 2:
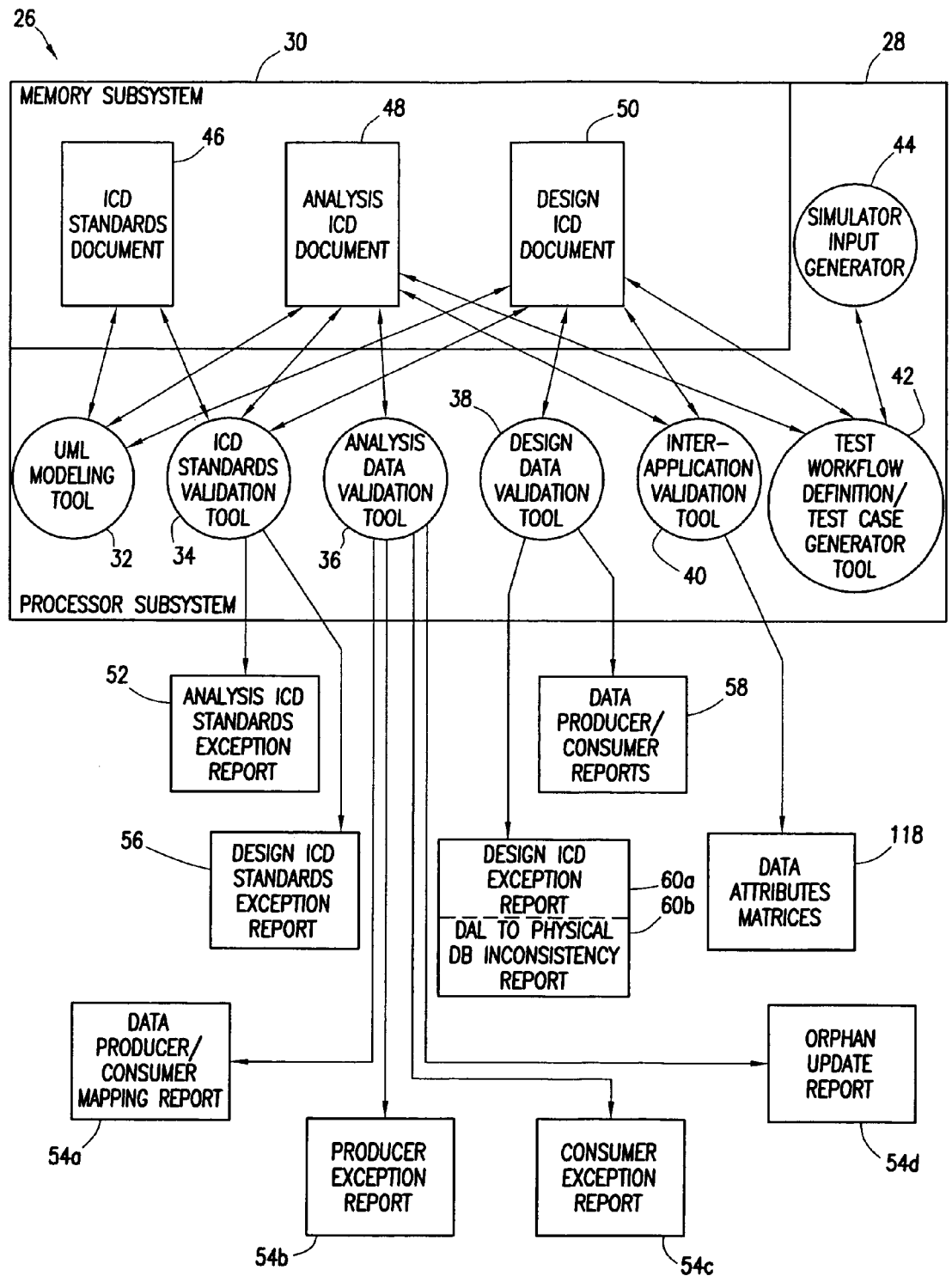
FIG. 2 is a device for constructing a model of the integrated enterprise of FIG. 2.

Referring next to FIG. 2, a device 26 for constructing a model of the integrated enterprise 10 of FIG. 1 will now be described in greater detail. The integrated enterprise modeling device 26, which typically resides within a computer system, for example, a personal computer ("PC") having a processor subsystem 28 and a memory subsystem 30 coupled to one another, is comprised of first, second, third, fourth, fifth, sixth and seventh tools 32, 34, 36, 38, 40, 42 and 44. Each one of the tools 32 through 44 is a software application comprised of a series of instructions encoded in the memory subsystem 30 of the integrated enterprise modeling device 26 as computer readable program code and executable by the processor subsystem 28 of the integrated enterprise modeling device 26. As used herein, the term "processor subsystem" refers to the collective processing capacity of the computer system in which the integrated enterprise modeling device 26 resides. Similarly, as used herein, the term "memory subsystem" refers to the collective memory capacity of the computer system in which the integrated enterprise modeling device 26 resides. While it is contemplated that, in one embodiment of the invention, the computer system may be exclusively dedicated to the functionality which embodies the integrated enterprise modeling device 26, more typically, the computer system will be configured to provide additional functionality and will include a platform (not shown), for example, the Windows NT platform manufactured by Microsoft Corporation of Redmond, Wash., from which the integrated enterprise modeling device 26 is launched. As will be more fully described below, after launching the integrated enterprise modeling device 26 from the Windows NT platform, a computer user models the integrated enterprise 10 by constructing a series of documents, which include first, second and third documents 46, 48 and 50, using the tools 32 through 44. The documents created by the computer user and subsequently stored in the memory subsystem 30 collectively describe the integrated enterprise 10. Of course, it should be clearly understood that, as described and illustrated herein, the integrated enterprise modeling device 26 has been greatly simplified and that various ones of the documents constructed during the modeling process and/or the tools used to construct those documents have been omitted for ease of description.

The first (or "ICD standards") document 46 documents the guidelines with which the second (or "analysis ICD") document 48 and the third (or "design ICD") document 50 are to be subsequently constructed. The ICD standards document 46 is constructed using a word processing application (not shown), for example, Microsoft Word. The analysis ICD document 48 and the design ICD document 50, on the other hand, both identify the sequence of events exchanged between applications, the interfaces between applications and brokers and the interfaces between applications. Typically, the design ICD document 50 differs from the analysis ICD document 48 in that the design ICD document 50 also captures database mapping between the data access layer 23 and the physical layer of the shared databases 22 and 24 for the integrated enterprise 10. The analysis ICD document 48 and the design ICD document 50 are both constructed using the first (or "UML modeling") tool 32. The UML modeling tool 32 used to construct the analysis ICD document 48 and the design ICD document 50 may be any one of a number of commercially available software applications. For example, a software application commonly known as "Rational Rose" and manufactured by Rational Software Corporation of Cupertino, Calif. and Lexington, Mass. would be suitable for constructing the analysis ICD document 48 and the design ICD document 50.

After the ICD standards document 46 is constructed using Microsoft Word or another word processing program, a user operating the UML modeling tool 32 applies the analysis ICD standards contained in the ICD standards document 46 to information, typically in the form of plural documents (not shown) describing the system requirements of the integrated enterprise 10 to be modeled to construct the analysis ICD document 48. After the analysis ICD document 48 is constructed, the ICD standards validation tool 34 checks the analysis ICD document 48 to determine that the analysis ICD document 48 complies with the analysis ICD standards set forth in the ICD standards document 46. After completing an analysis of the analysis ICD document 48, the ICD standards validation tool 34 generates an analysis ICD standards exceptions report 52 which, in turn, may be used as a guide in a subsequent modification of the analysis ICD document 48 (if needed) to place the analysis ICD document 48 into compliance with the analysis ICD standards set forth in the ICD standards document 46.

After the analysis ICD document 48 has been brought into compliance with the analysis ICD standards set forth in the ICD standards document 46, construction of an interim analysis model of the integrated enterprise 10 is complete and construction of an integrated analysis model of the integrated enterprise 10 commences. To do so, the analysis data validation tool 36 analyzes the analysis ICD document 48 to validate the various accesses of the shared databases 22 and 24 by the applications 12a through 12f of the integrated enterprise 10 which are described in the analysis ICD document 48. After completing an examination of the analysis ICD document 48, the analysis data validation tool 36 generates, for data attributes that are stored in and/or retrieved from the shared databases 22 and 24 by the applications 12a through 12f, an analysis data producer/consumer mapping report 54a, a producer exception report 54b, a consumer exception report 54c and an orphan update report 54d which identifies data attributes updated but never created. By identifying, in the analysis data producer/consumer reports 54a through 54d, (1) a map of producers and consumers of data attributes; (2) a first exception report identifying data attributes which one or more of the applications 12a through 12f seeks to consume but none of the applications 12a through 12f ever produced; and (3) a second exception report identifying data attributes produced by one or more of the applications 12a through 12f but never consumed by any of the applications 12a through 12f, the analysis data producer/consumer reports 54a through 54d may be used as a guide during a subsequent modification of the analysis ICD document 48, again using the UML modeling tool 32, to correct any errors contained in the analysis ICD document 48, thereby constructing an integrated analysis model of the integrated enterprise 10. Furthermore, it should be noted that, by modifying the analysis ICD document 48 based upon the information contained in the analysis data producer/consumer reports 54a through 54d, modeling errors contained in the analysis ICD document 48 may be identified and corrected relatively early in the modeling process. Finally, once the results of an application of the analysis data validation tool 36 against the analysis ICD document 48 indicates a correspondence between producers and consumers of data attributes, the analysis ICD document 48 may be deemed as having been validated for any further usages thereof.

Once the analysis ICD document 48 has been validated, the UML modeling tool 32 is then used to construct the design ICD document 50, this time by applying the design ICD standards contained in the ICD standards document 46 to information, typically comprised of the analysis ICD document 48 and additional documents describing the physical layer of the shared databases 22 and 24 to construct the design ICD document 50. After the design ICD document 50 is constructed, the ICD standards validation tool 34 checks the document to determine whether the design ICD document 50 complies with the design ICD standards set forth in the ICD standards document 46. After completing an analysis of the design ICD document 50, the ICD standards validation tool 34 generates a design ICD standards exceptions report 56 which, in turn, may be used as a guide in a subsequent modification of the design ICD document 50 into compliance with the design ICD standards set forth in the ICD standards document 46.

In accordance with the embodiment of the invention set forth herein, the ICD standards document 46 contains both the analysis ICD standards and the design ICD standards for the integrated enterprise 10. In further accordance with the disclosed embodiment, a single tool, specifically, the ICD standards validation tool 34, applies the analysis ICD standards and the design ICD standards contained in the ICD standards document 46 to the analysis ICD document 48 and the design ICD document 50, respectively, to produce the analysis ICD standards exception report 52 and the design ICD standards exception report 56. It should be clearly understood, however, that, in alternate embodiments of the invention, the analysis ICD standards and the design ICD standards may be maintained in separate documents and, in further alternate embodiments of the invention, discrete tools, specifically, an analysis ICD standards validation tool and a design ICD standards validation tool, may be used to examine the analysis ICD document 48 and the design ICD document 50, respectively. Finally, in still another embodiment of the invention, the functionality residing in the ICD standards validation tool 34 may be placed within the analysis data validation tool 36 and the design data validation tool 38. In such an embodiment, the analysis data validation tool 36 would generate the analysis ICD standards exception report 52 while the design data validation tool 38 would generate the design ICD standards exception report 56, for example, at the same general time that the analysis data validation tool 36 and design data validation tool 38 generate analysis data producer/consumer reports 54a through 54d and design data producer/consumer reports 58, respectively.

After the design ICD document 50 has been brought into compliance with the design ICD standards set forth in the ICD standards document 46, construction of an interim design model of the integrated enterprise 10 is complete and construction of an integrated design model of the integrated enterprise 10 commences. To do so, the design data validation tool 38 analyzes the design ICD document 50 to validate the various accesses to the physical layer of the shared databases 22 and 24 by the applications 12a through 12f of the integrated enterprise 10 set forth therein. After completing an analysis of the design ICD document 50, the design data validation tool 38 generates design data producer/consumer reports 58 for physical data attributes that are stored in and/or retrieved from the shared databases 22 and 24 by the applications 12a through 12f. It should be clearly understood that the design data producer/consumer reports 58 include a design data producer/consumer mapping report, a producer exception report, a consumer exception report and an orphan update report and appear in the drawings as a single element purely for ease of illustration. The design data validation tool 38 will also generate a design ICD exception report 60a and a data access layer-to-physical database inconsistency report 60b to identifies inconsistencies, within the design ICD document 50, in mapping attributes of the information broker 20 to the physical layer of the shared databases 22 and 24. By identifying, in the design data producer/consumer reports 58, the design ICD exception report 60a and the data access layer-to-physical database inconsistency report 60b: (1) a map of producers and consumers of physical data attributes; (2) a first exception report identifying physical data attributes which one or more of the applications 12a through 12f seeks to consume but none of the applications 12a through 12f ever produced; (3) a second exception report identifying physical data attributes produced by one or more of the applications 12a through 12f but never consumed by any of the applications 12a through 12f; and (4) inconsistencies in mapping data attributes from the data access layer to the physical layer of the shared databases 22 and 24, the design data producer/consumer reports 58, the design ICD exception report 60a and the data access layer-to-physical database inconsistency report 60b may be used as a guide during a subsequent modification of the design ICD document 50, thereby constructing an integrated design model of the integrated enterprise 10. As before, it should be noted that, by modifying the design ICD document 50 based upon the information contained in the design data producer/consumer reports 58, the design ICD exception report 60a and/or the data access layer-to-physical database inconsistency report 60b, modeling errors contained in the design ICD document 50 may be identified and corrected relatively early in the modeling process. Finally, once the results of an application of the design data validation tool 38 against the design ICD document 50 indicates a correspondence between producers and consumers of data attributes and the absence of any data access layer-to-physical database inconsistencies, the design ICD document 50 may be deemed as having been validated for any further usages thereof.

While the analysis data validation tool 36 and the design data validation tool 38 are used to identify errors in application-to-database calls within the model of the integrated enterprise 10, the inter-application validation tool 40 is used to identify errors in application-to-application calls within the model of the integrated enterprise 10 by analyzing the application-to-application calls within the model of the integrated enterprise 10 on a data attribute-by-data attribute basis. As disclosed herein, the inter-application validation tool 40 is suitable for use with either the analysis ICD document 48 and/or the design ICD document 50 which model the integrated enterprise 10. Typically, the inter-application validation tool 40 would be used to examine the analysis ICD document 48 subsequent to the examination thereof by the analysis data validation tool 36 and prior to construction of the design ICD document 50. Similarly, the inter-application validation tool 40 would be used to examine the design ICD document 50 subsequent to examination thereof by the design data validation tool 38.

The test workflow definition/test case generation tool 42 defines all of the integration scenarios that need to be tested during end-to-end testing and generates integration test cases for the integration scenarios from the analysis and design ICD documents 48 and 50. Finally, the simulator input generator 44, which uses the test workflow definition/test case generator tool 42, is an automated testing tool that allows simulation of external systems for interfaces testing. The simulator input generator 44 also generates the interface information required for simulating the interfaces.

Figure 3:
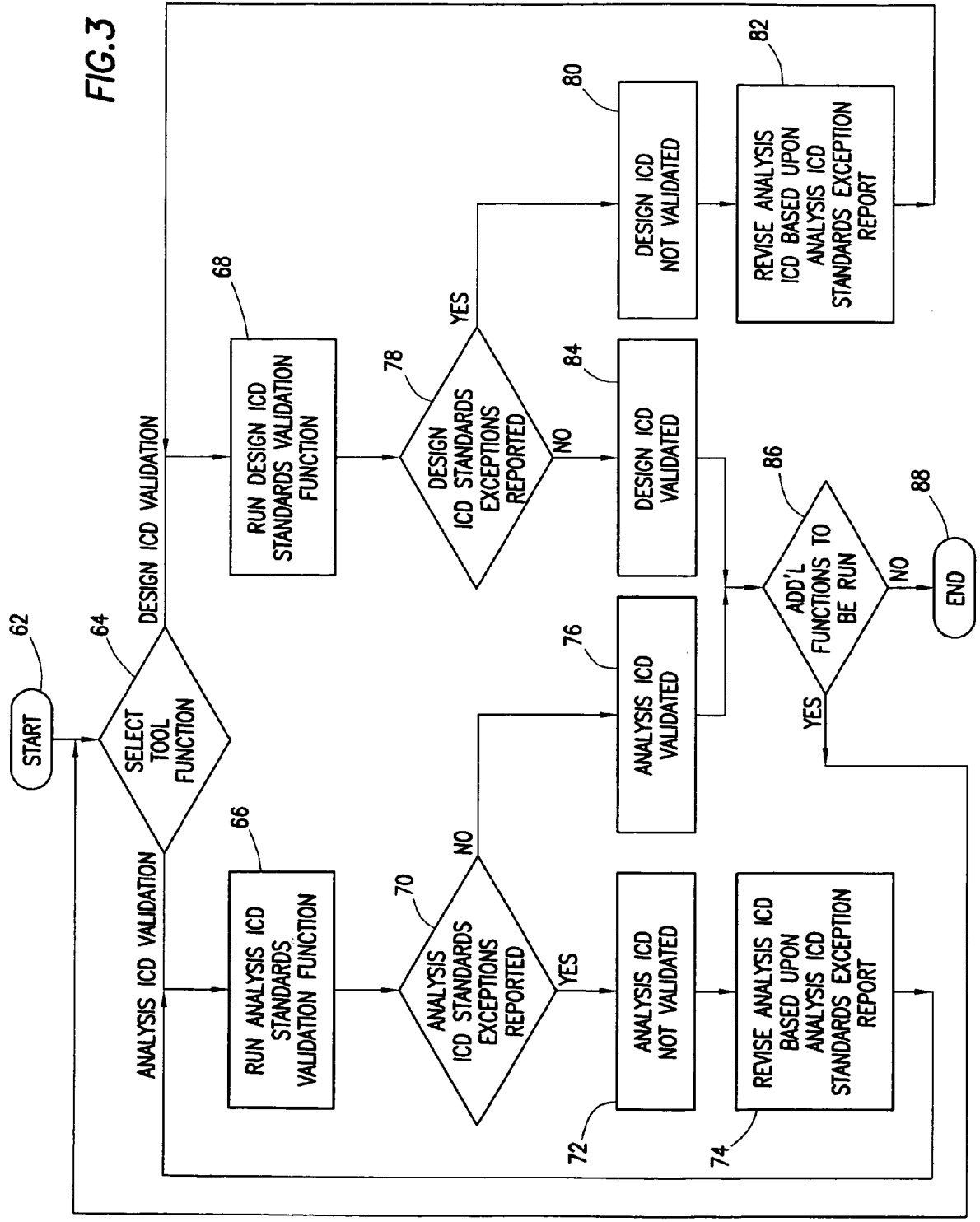
FIG. 3 is a flowchart of a method of determining compliance of a model constructed using the device of FIG. 2 with a set of standards.

Referring next to FIG. 3, a method of determining compliance of a model (or portion thereof), for example, the analysis ICD document 48 or the design ICD document 50, with a standards document, for example, the ICD standards document 46, will now be described in greater detail. The method commences at step 62 and, at step 64, the user selects one of plural functions which may be performed using the ICD standards validation tool 34, for example, by selecting one of any number of function names appearing on a menu. As disclosed herein, the ICD standards validation tool 34 may perform either of two functions—an analysis ICD standards validation or a design ICD standards validation. It should be clearly understood, however, that the ICD standards validation tool 34 may be equipped with additional functionality other than that specifically recited herein. If, at step 64, the user selects the analysis ICD standards validation function, the method proceeds to step 66 where the ICD standards validation tool 34 executes the analysis ICD standards validation function. After executing the analysis ICD standards validation function at step 66, the method proceeds to step 70 where the ICD standards validation tool 34 generates an analysis ICD standards exception report listing all of the exceptions from ICD standards identified in the analysis ICD document.

If one or more exceptions from the ICD standards are identified in the analysis ICD document at step 70, the method proceeds to step 72 where the analysis ICD document is deemed to not be validated. The method then proceeds to step 74 where the user of the ICD standards validation tool 34 revises the analysis ICD document based upon the analysis ICD standards exception report generated thereby. Using the analysis ICD standards exception report as a guide, the user should be able to readily identify violations of the ICD standards contained in the analysis ICD document and correct the analysis ICD document to remove all such violations. After revising the analysis ICD document in this manner, the method returns to step 64 for further processing in the manner previously described. If, however, no exceptions from the ICD standards are identified in the analysis ICD document at step 70, the method proceeds to step 76 where the analysis ICD document is deemed to be validated.

Returning now to step 64, if the user selects the design ICD standards validation function, the method proceeds to step 68 where the ICD standards validation tool 34 executes the design ICD standards validation function. After executing the design ICD standards validation function at step 68, the method proceeds to step 78 where the ICD standards validation tool 34 generates a design ICD standards exception report listing all of the exceptions from ICD standards identified in the design ICD document. If one or more exceptions from the ICD standards are identified in the design ICD document at step 78, the method proceeds to step 80 where the design ICD document is deemed to not be validated. The method then proceeds to step 82 where the user of the ICD standards validation tool 34 revises the design ICD document based upon the design ICD standards exception report generated thereby. Using the design ICD standards exception report as a guide, the user should be able to readily identify violations of the ICD standards contained in the design ICD document and correct the design ICD document to remove all such violations. After revising the design ICD document in this manner, the method returns to step 64 for further processing in the manner previously described. If, however, no exceptions from the ICD standards are identified in the design ICD document at step 78, the method proceeds to step 84 where the design ICD document is deemed to be validated. Upon validation of the analysis ICD document at step 76 or upon validation of the design ICD document at step 84, the method proceeds to step 86 where the user determines if additional functions are to be executed using the ICD standards validation tool 34. If it is determined at step 86 that additional functions are to be executed, the method returns to step 64 for selection of another function. If, however, no additional functions are to be executed, the method ends at step 88.

Figures 2, 4A:
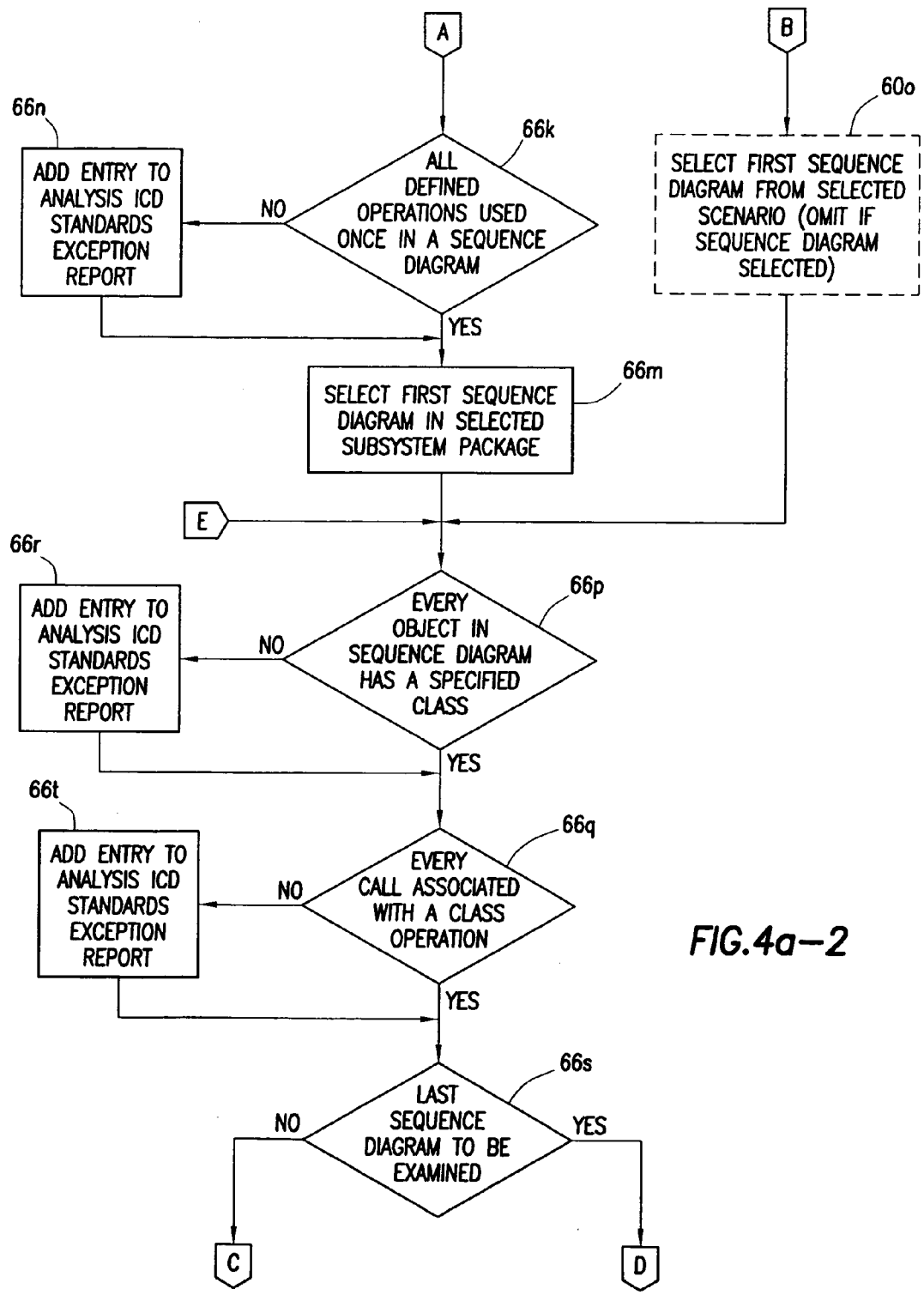
FIG. 4a is an expanded flowchart of an analysis ICD standards validation function of FIG. 3.

Referring next to FIG. 4a, the analysis ICD standards validation function executed at step 66 of FIG. 3 will now be described in greater detail. As previously set forth, by executing the analysis ICD standards validation function, an analysis ICD of a model of an integrated enterprise, for example, the analysis ICD document 48 of the model of the integrated enterprise 10 is examined for compliance with the analysis ICD standards set forth in the ICD standards document 46. After examination of the analysis ICD document 48 by the ICD standards validation tool 34 is complete, the ICD standards validation tool 34 generates the analysis ICD standards exception report 52 which, as previously described, details how the analysis ICD document 48 deviates from the analysis ICD standards set forth in the ICD standards document 46.

Prior to describing this method, however, a brief description of an analysis ICD document and the associated analysis ICD standards exception report, for example, the analysis ICD document 48 and the analysis ICD standards exception report 52 produced by the ICD standards validation tool 34 upon examination of the analysis ICD document 48, will greatly facilitate an understanding of the present invention. In FIG. 5, a model 100, which is typically stored in the memory subsystem 30 of the integrated enterprise modeling device 26, of an integrated enterprise is illustrated in the manner by which it is graphically displayed to the user by the UML modeling tool 32 using the Windows NT platform. The model 100 is comprised of plural packages which may be opened by the user. Of these, within a first (or "analysis") ICD package 102 is the analysis ICD document 48 while within a second (or "design") ICD package 104 is the design ICD document 50. Of course, the model 100 includes other packages in addition to the analysis ICD package 102 and the design ICD package 104 and it is fully contemplated that these other packages may also be validated by the ICD standards validation tool 34 or a similarly configured validation tool using the techniques disclosed herein.

Figure 6:
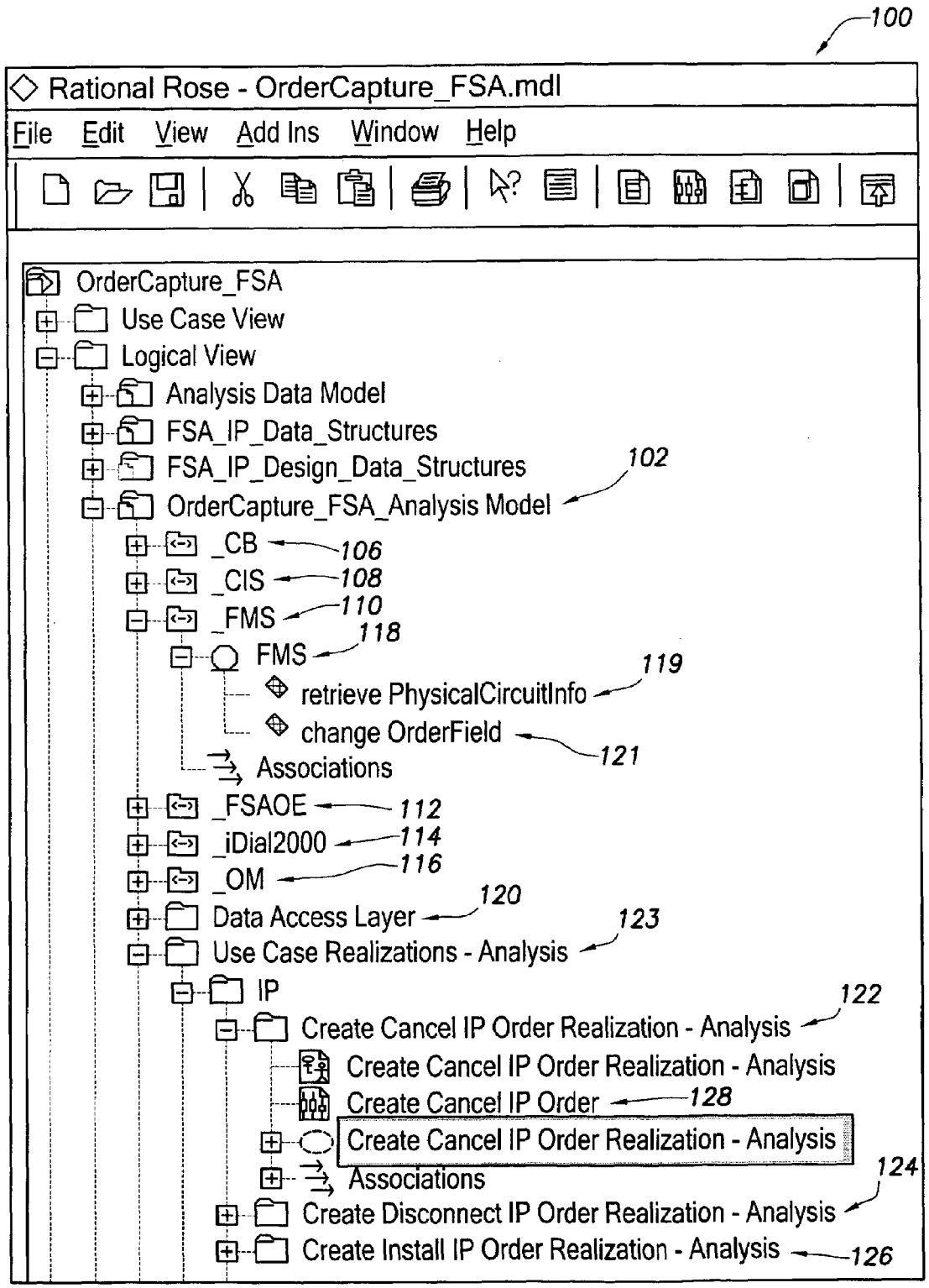
FIG. 6 is a second illustration of the integrated enterprise model of FIG. 5 expanded to better show an analysis package thereof.

As may be seen in FIG. 6, the analysis ICD package 102 has been opened to show the contents of the analysis ICD document 48. As may now be seen, the analysis ICD document includes a first (or "_CB") subsystem package 106, a second (or "_CIS") subsystem package 108, a third (or "_FMS") subsystem package 110, a fourth (or "_FSAOE") subsystem package 112, a fifth (or "_iDial2000") subsystem package 114 and a sixth (or "_OM") subsystem package 116. Of course, it should be clearly understood that the analysis ICD package 102, as well as the design ICD package 104 may have any number of subsystem packages. Each one of the subsystem packages 106 through 116 describes a subsystem (or "class") of the integrated enterprise 10. For example, the fifth subsystem package 114 describes an "iDial2000" application which, as illustrated in FIG. 1, may be one of the applications 12a through 12f coupled to the EAI system 14.

As further illustrated in FIG. 6, the third subsystem package 110 has been opened to show the subsystem entity 118, which, as indicated by the generally circular iconic representation proximate to the alphanumeric character string "FMS", is an application entity. Of course, it should be clearly understood that the foregoing disclosure of the third subsystem package 110 as an application package is purely by way of example and that the remaining subsystem packages may either be additional application packages or other types of subsystem packages. By opening the third subsystem package 110, the operations under the FMS application entity, more specifically, a first (or "retrieve PhysicalCircuitInfo") operation 119 and a second (or "change OrderField") operation 121 may also be seen. Each one of the first and second operations 119 and 121, which periodically are referred to in the art as "methods", describes an interface to the third subsystem 110 of the model 100. Of course, it should be clearly understood that the foregoing disclosure of the third subsystem 110 of the model 100 as having a pair of interfaces is purely by way of example and that it is fully contemplated that there may be any number of interfaces to the third subsystem 110 of the model 100. It should be further understood that the remaining subsystems of the integrated enterprise may, like the third subsystem 110, have any number of interfaces thereto.

The analysis ICD package 102 further includes a seventh (or "DAL") subsystem package 120 which describes the data access layer 23. As will be more fully described below, the DAL subsystem package 120 describes the interfaces between the data access layer 23 and the various applications 12a through 12f forming part of the integrated enterprise 10 which enable those applications to access the shared databases 22, 24. The DAL subsystem package 120 includes plural use case realization packages, each of which shows how the various applications (or other subsystems) interact to implement a specific use of the shared databases 22 and 24 through the data access layer 23. For example, FIG. 6 shows a Use Case Realizations subsystem package 123 including a first (or "Create Cancel IP Order") use case realization package 122, a second (or "Create Disconnect IP Order") use case realization package 124 and a third (or "Create Install IP Order") use case realization package 126. Each use case realization describes how a particular operation which accesses the data access layer 23 is to be conducted. Of course, it should be clearly understood that the foregoing disclosure of the Use Case Realizations subsystem package 123 of the model 100 as having three use case realizations describing respective accesses to the data access layer 23 is purely by way of example and that it is fully contemplated the Use Case Realizations subsystem package 123 may instead include any number of use case realizations.

Use case realizations are depicted using sequence and collaboration diagrams which describe the various tasks to be performed by the integrated enterprise 10 to fulfill the requirements of the use case. As further shown in FIG. 6, the Create Cancel IP Order use case realization package 122 has been opened to show the sequence diagrams which depict the Create Cancel IP Order use case realization package 122. As may now be seen, the Create Cancel IP Order use case realization package 122 includes a first (or "Create Cancel IP Order") sequence diagram 128. Of course, while the depiction of the Create Cancel IP Order use case realization package 122 requires only a single sequence diagram, other use case realization packages may require a greater number of sequence diagrams for proper depiction thereof.

Figure 7:
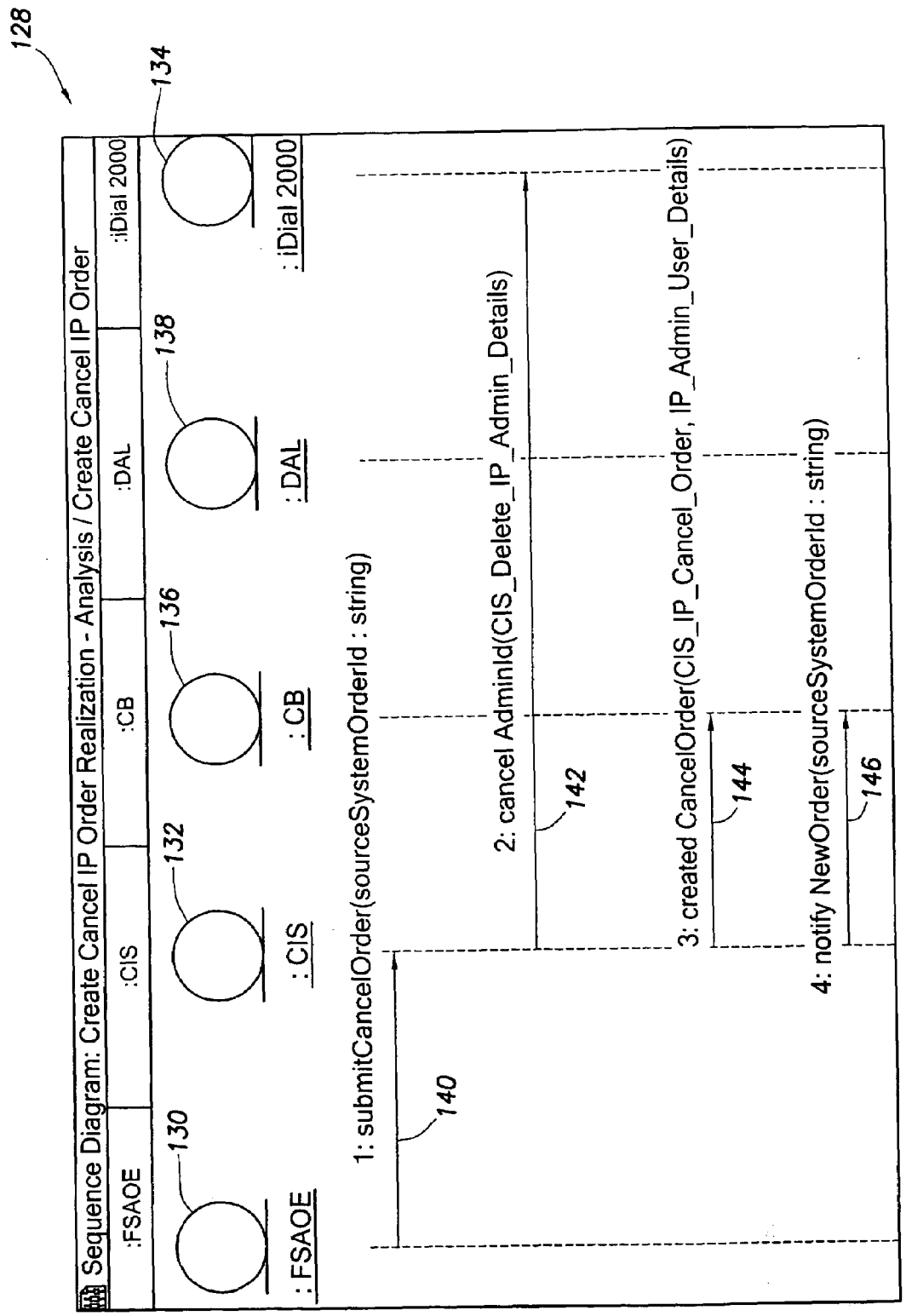
FIG. 7 is an illustration of a selected sequence diagram of the analysis package of FIG. 6.

The Create Cancel IP Order sequence diagram 128 is shown in greater detail in FIG. 7. As previously set forth, the Create Cancel IP Order sequence diagram 128 describes a task to be performed by the integrated enterprise 10 modeled by the model 100. To describe this task, the sequence diagram 128 identifies the applications, brokers, databases and/or other subsystems of the integrated enterprise involved in performing the task. Typically, each type of subsystem (or "class") involved in the task is represented, in the sequence diagram 128, by an iconic representation and the alphanumeric character string identifying the name of the application, broker, database or other type of subsystem involved in the task. For example, for the task described by the sequence diagram 128, a first (or "FSAOE") application 130, a second (or "CIS") application 132, a third (or "iDial2000") application 134, a control broker (or "CB") 136 and a data access layer (or "DAL") 138 are all classes involved in performing the task.

Beneath the iconic representations/names of the classes of the enterprise involved in the task described by the sequence diagram 128, a first call 140, a second call 142, a third call 144 and a fourth call 146 are listed in a descending order which corresponds to the order of execution when the task described by the sequence diagram 128 is performed. Of course, only a portion of the sequence diagram 128 is visible in FIG. 7. As a result, any number of additional classes, either applications, brokers, databases or other subsystems, and/or additional calls which also form part of the sequence diagram 128 cannot be seen in FIG. 7. Whether visible or not, each call has a source class and a target class. In the sequence diagram 128, each call forming part of the task is iconically represented by an arrow with the source class for the call generally aligned with the tail of the arrow and the target class for the call generally aligned with the head of the arrow. For example, the source class for the call 142 is the CIS application 132 while the target class for the call is the iDial2000 application 134. In contrast, while the source class for the call 144 is also the CIS application 132, the target class for the call 144 is the control broker 136. Positioned above each iconic representation of a call in the sequence diagram 128 is a description of the call. The description of each call is comprised of three portions—a logical operation name, a logical data aggregate portion and a data attribute portion. For example, the call 142 is comprised of the logical operation CANCEL, the logical data aggregate "AdminID" and the data attribute "CIS_Delete_IP_Admin_Details." In contrast, the call 144 is comprised of the logical operation CREATED, the logical data aggregate "CancelOrder" and the data attributes "CIS_IP_Cancel_Order" and "IP_Admin_User_Details."

As previously set forth, after an analysis ICD document is constructed, the ICD standards validation tool 34 may be used to determine if the analysis ICD document 48 complies with the analysis ICD standards set forth in the ICD standards document 46. Similarly, after a design ICD document is constructed, the ICD standards validation tool 34 may again be used, this time, to determine if the design ICD document 50 complies with the design ICD standards set forth in the ICD standards document 46. It should be noted, however, that it is not practical to verify that either the analysis or design ICD documents 48 or 50 complies with every ICD standard set forth in the ICD standards document 46. Accordingly, the ICD standards validation tool 34 is configured to check for compliance with selected ICD standards to be more fully described below. Certain of these checks are performed by the ICD standards validation tool 34 in conjunction with a standards configuration file 148. Similar to the analysis and design ICD documents 48 and 50, the standards configuration file 148 is constructed by a user operating the integrated enterprise modeling device 26 while using the ICD standards document 46 as a guide. In constructing the standards configuration file 148, the user considers the type of checks to be performed by the ICD standards validation tool 34 in combination with the guidelines set forth in the ICD standards document 46. Upon construction thereof, the ICD standards configuration file 148 is stored in the memory subsystem 30 where it may be periodically retrieved by the ICD standards validation tool 34 whenever the tool initiates a validation of an analysis ICD document or a design ICD document.

Figure 8:
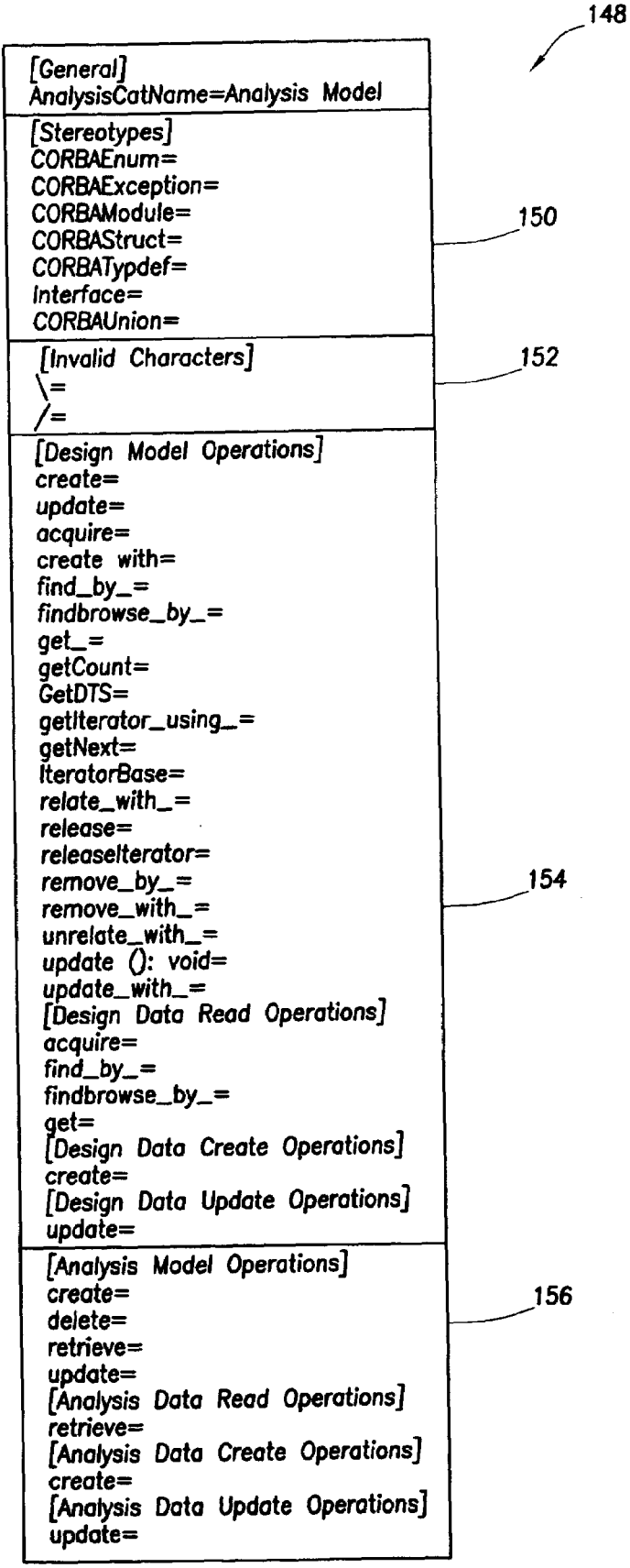
FIG. 8 is an illustration of a standards configuration file used to identify exceptions between the model of the integrated enterprise and a set of standards.

Referring next to FIG. 8, the standards configuration file 148 will now be described in greater detail. As may now be seen, the standards configuration file 148 includes first, second, third and fourth portions 150, 152, 154 and 156, each of which contains data for use in determining compliance of either the analysis ICD document 48 or the design ICD document 50 with a selected ICD standard. More specifically, data contained in the first portion 150 of the standards configuration file 148 is used to determine compliance of the design ICD document 50 with a first ICD standard that requires that each subsystem package of the data access layer 23 of the design ICD document 50 includes a defined stereotype which describes the CORBA interface between the subsystem and the data access layer 23. Data contained in the second portion 152 of the standards configuration file 148 is used to determine compliance of the design ICD document 50 with a second ICD standard that requires that neither the data access layer package of the design ICD document 50, nor any of the other subsystem packages thereof, include user-defined names which have invalid characters. Data contained in the third portion 154 of the standards configuration file 148 is used to determine compliance of the design ICD document 50 with a third ICD standard that requires that all operations forming part of the data access layer package of the design ICD document 50 are defined operations. Finally, data contained in the fourth portion 156 of the standards configuration file 148 is used to determine compliance of the analysis ICD document 48 with a fourth ICD standard that requires that all operations forming part of the data access layer package of the analysis ICD document 48 are defined operations.

As disclosed herein, the standards configuration file 148 includes four portions, each of which contains data for use, by the ICD standards validation tool 34, when determining whether the analysis ICD document 48 or the design ICD document 50 complies with a particular ICD standard. It should be clearly understood, however, that the standards configuration file 148 may include data suitable for determining compliance of either the analysis ICD document 48 and/or the design ICD document 50 with any number of ICD standards contained in the ICD standards document 46. Furthermore, it should be noted that, while the standards configuration file 148 is described as having discrete portions, each used to determine compliance of either the analysis ICD document 48 or the design ICD document 50 with a specified ICD standard, the foregoing description is used merely to enhance an understanding of the present disclosure and it is specifically contemplated that the standards configuration file 148 may instead be configured without some or all of the aforementioned discrete portions thereof. Finally, it should be noted that the ICD standards validation tool 34 is not limited to determining compliance with those ICD standards for which data is maintained in the standards configuration file 148. Rather, it is contemplated that the tests for compliance with other ICD standards may be encoded into the set of instructions which comprises the ICD standards validation tool 34.

Referring next to FIG. 9, an analysis ICD standards exception report 158 which is produced by the ICD standards validation tool 34 examining the analysis ICD document 48 contained in the analysis ICD package 102 will now be described in greater detail. As may now be seen, the analysis ICD standards exception report 158 includes first, second, third, fourth and fifth entries 160, 162, 164, 166 and 168, each of which describes an exception in the analysis ICD package 102 examined by the ICD standards validation tool 34. Of course, only a portion of the analysis ICD standards exception report 158 is visible in FIG. 9. Accordingly a number of other entries, each detailing an additional exception, as well as additional information contained in those entries which are visible, are hidden from view. Each entry 160 through 168 details an exception in sufficient detail such that, upon reviewing the analysis ICD standards exception report 158, a computer user would be able to promptly identify the location, within the analysis ICD package 102 of the error causing the exception. For example, the call 144 of the sequence diagram 128 illustrated in FIG. 6 contains a typographical error. Specifically, the operation CREATE was coded into the analysis ICD package 102 as CREATED. When the ICD standards validation tool 34 subsequently examined the analysis ICD package 102, the aforementioned typographical error created several exceptions, each causing the ICD standards validation tool 34 to generate an entry in the analysis ICD standards exception report 158. For example, when the ICD standards validation tool 34 compared the CREATED operation contained in the sequence diagram 128 to the supported operations contained in the fourth portion 156 of the standards configuration file 148, the ICD standards validation tool 34 concluded that operation and constructed the fourth entry 166 to describe the identified exception.

Returning now to FIGS. 4a-1, the method by which the analysis ICD standards validation function is executed at step 66 of FIG. 3 will now be described in greater detail. The method commences at step 66a and, at step 66b, an analysis ICD document, for example, the analysis ICD document 48, or a selected portion thereof, is selected for examination to determine compliance of the document or selected portion thereof with ICD standards. Variously, it is contemplated that either: (a) the entire analysis ICD package 102; (b) one or more subsystem packages of the analysis ICD package 102, for example, one or more of the _CB subsystem package 106, the _CIS subsystem package 108, the _FMS subsystem package 110, the _FSAOE subsystem package 112, the _iDial2000 subsystem package 114, the _OM subsystem package 116 and DAL subsystem package 120; (c) a selected scenario comprised of plural sequence diagrams of a selected subsystem package 106, 108, 110, 112, 114, 116 or 120 of the analysis ICD package 102; or (d) a selected sequence diagram of a selected subsystem package 106, 108, 110, 112, 114, 116 or 120 of the analysis ICD package 102 may be selected at step 66b for further examination.

If the entire analysis ICD package 102 is selected at step 66b for examination, the method proceeds to step 66c where generation of an analysis ICD standards exception report detailing variations of the analysis ICD package 102 from the ICD standards is commenced. Similarly, if a subsystem package of the analysis ICD package 102 is selected at step 66b for further examination, the method will instead proceed to step 66d where generation of an analysis ICD standards exception report detailing variations of the selected subsystem package from the ICD standards is commenced. Finally, if a scenario comprised of plural sequence diagrams or a single sequence diagram is selected at step 66b for examination, the method will instead proceed to step 66e where generation of an analysis ICD standards exception report detailing variations of the selected scenario or sequence diagram from the ICD standards is commenced.

Returning to step 66c, upon commencing generation of an analysis ICD standards exception report for the analysis ICD package 102, the method will then proceed to step 66f for selection of a first subsystem package of the analysis ICD package 102 for examination. For example, for the analysis ICD document 102, the _CB subsystem package 106, the _CIS subsystem package 108, the _FMS subsystem package 110, the _FSAOE subsystem package 112, the _iDial2000 subsystem package 114, the _OM subsystem package 116 and the DAL subsystem package 120 must all be examined. It is contemplated that the subsystem packages 106, 108, 110, 112, 114, 116 and 120 of the analysis ICD document 102 may be examined in any order. For example, the subsystem packages 106, 108, 110, 112, 114, 116 and 120 may be examined in the descending order within the analysis ICD package 102 illustrated in FIG. 6.

Upon selection at step 66f of a first subsystem package of the analysis ICD package 102 for examination or upon commencing generation of an analysis ICD standards exception report for a selected subsystem package at step 66d, the method proceeds to step 66g where it is determined if the selected subsystem package is a DAL subsystem package. If the selected subsystem package is not a DAL subsystem package, for example, if the selected subsystem package is any one of the _CB subsystem package 106, the _CIS subsystem package 108, the FMS subsystem package 110, the _FSAOE subsystem package 112, the _iDial2000 subsystem package 114, or the _OM subsystem package 116, the method proceeds to step 66k for further processing in the manner to be more fully described below. If, however, the selected subsystem package is a DAL subsystem package, the method then proceeds to step 66h for determination if all of the operations in the DAL subsystem package are supported. To make this determination, the ICD standards validation tool 34 compares each operation contained in the DAL subsystem package to the DAL supported operations defined in the fourth portion 156 of the standards configuration file 148.

As may be seen in FIG. 8, the DAL supported operations are the CREATE operation which writes data to the database, the RETRIEVE operation which retrieves data from the database, the UPDATE operation which removes data from the database for subsequent replacement by new data and the DELETE operation which removes data from the database. Thus, the CREATE, RETRIEVE, UPDATE and DELETE (or "CRUD") operations are supported while any other operation is not. Accordingly, if all of the operations contained in the DAL subsystem package match the CRUD operations contained in the fourth portion 156 of the standards configuration file 148, then all of the operations in the DAL subsystem package are supported and the method proceeds to step 66i for further processing. If, however, one or more of the operations contained in the DAL subsystem package does not match an operation contained in the fourth portion 156 of the standards configuration file 148, those operations are not supported and the method will instead proceed to step 66j where an entry describing each unsupported operation is added to the analysis ICD standards exception report being constructed.

Proceeding on to step 66i, the ICD standards validation tool 34 next determines if each operation contained in the DAL subsystem package has the correct combination of return types and/or arguments. More specifically, data sent in CREATE or UPDATE operations, as well as returned in a RETRIEVE operation must be in a structure which follows the following naming convention:

Analysis_<logical name>StorageType while, for RETRIEVE and DELETE operations, the operation must also include either a key, either a PKey (primary), as illustrated below:

Analysis_<logical name>PKey an SKey (secondary) or a FKey (foreign). Accordingly, if the ICD standards validation tool 34 determines at step 66i that all of the CREATE, UPDATE and RETRIEVE operations forming part of the DAL subsystem package have a structure which includes a storage type and that all of the RETRIEVE and DELETE operations have a key, the method will proceed to step 66k for further processing. If, however, the ICD standards validation tool 34 determines at step 66i that any CREATE, UPDATE or RETRIEVE operation forming part of the DAL subsystem package lacks a structure that includes a storage type or that any RETRIEVE or DELETE operation forming part of the DAL subsystem package lacks a key, the method will instead proceed to step 66l where an entry to the analysis ICD standards exception report is generated for each such variance noted. The method then proceeds to step 66k for further processing.

Upon determining, at step 66i, that each type of operation in the DAL subsystem package has the correct combination of return type/argument for that particular type of operation, generating, at step 66l, an entry in the analysis ICD standards exception report for each operation not having the correct combination of return type/argument or determining, at step 66g, that the selected package is not a DAL subsystem package, the method proceeds to step 66k where the ICD standards validation tool 34 will now determine whether all of the operations of the selected package are used in a sequence diagram which depicts the operation. If all of the operations forming part of the selected package are used in a sequence diagram which, in whole or part, depicts that operation, the method proceeds to step 66*m* for further processing. If, however, one or more of the operations forming part of the selected package are not used in a sequence diagram which, in whole or part, depicts that operation, the method will instead proceed to step 66*n* where an additional entry for the analysis ICD standards exceptions report is generated for each such operation failing to be used in a sequence diagram. The method would then proceed to step 66*m* for further processing. For example, the DAL subsystem package 120 contains plural operations, one of which is the "create Cancel IP Order" operation. However, the sequence diagram 128 which depicts the "create Cancel IP Order operation" does not have a call which uses the CREATE operation due to the previously noted typographical error which occurred while the user was creating the sequence diagram 128 using the UML tool 32. Accordingly, when examining analysis ICD package 102, the ICD standards validation tool 34 would detect an exception because of the CREATE operation was not used in the sequence diagram depicting the CREATE "Cancel IP Order" operation.

Proceeding on to step 66*m*, a first sequence diagram from the selected package, here, the DAL package, is selected for further examination. Upon selection of a first sequence diagram at step 66*m* or if either a single sequence diagram was selected at step 66*b* for further examination or a scenario comprised of plural sequence diagrams was selected at step 66*b* for further examination and a first sequence diagram from the selected scenario was selected at step 66*o*, the method proceeds to step 66*p* where the IDS standards validation tool 34 determines if every object in the selected sequence diagram has a specified class. If every object in the selected sequence diagram has a specified class, the method proceeds to step 66*q* for further processing. If, however, one or more of the objects in the selected sequence diagram does not have a specified class, the method will instead proceed to step 66*r* where an entry for the analysis ICD standards exception report is generated for each such variance. The method would then proceed to step 66*q* for further processing. For example, the sequence diagram 128 has two occurrences of the object CancelOrder and a single occurrence of the objects AdminId and NewOrder. As may be further seen in FIG. 7, each of these classes have a specified class, specifically, the CIS class 132, the iDial2000 class 134 and the CB class 136.

Proceeding on to step 66*q*, the ICD standards validation tool 34 then determines if call contained in the selected sequence diagram is associated with a class operation. If every call in the selected sequence diagram is associated with a class operation, the method proceeds to step 66*s* for further processing. If, however, one or more of the calls in the selected sequence diagram is not associated with a class operation, the method will instead proceed to step 66*t* where an entry for the analysis ICD standards exception report is generated for each such variance. The method would then proceed to step 66*s* for further processing. For example, the sequence diagram 128 has four calls—a "submit" call, a "cancel" call, a "created" call and a "notify" call. As each of these calls interface first and second objects, all are in compliance with the ICD standard and no analysis ICD standards exceptions would be generated at step 66*q* for entry in the analysis ICD standards exception report. More specifically, the "submit" call is part of the interface between the FASOE object 130 and the CIS object 132, the "cancel" call is part of the interface between the CIS object 132 and the iDial2000 object 134, the "created" call is part of the interface between the CIS object 132 and the CB object 136 and the "notify" call is also part of the interface between the CIS object 132 and the CB object 136.

Proceeding on to step 66*s*, the ICD standards validation tool 34 determines whether the selected sequence diagram is the last sequence diagram of the scenario or subsystem package being examined. If it is determined that there are additional sequence diagrams in the scenario or subsystem package being examined, the method proceeds to step 66*u* for selection of a next sequence diagram of the selected scenario or subsystem package. The method then returns to step 66*p* for further processing of the newly selected sequence diagram in the manner previously described. If, on the other hand, it is determined at step 66*s* that the selected sequence diagram is the last sequence diagram of the selected scenario or subsystem package of the analysis ICD package 102 being examined, the method proceeds to step 66*v* where, if a subsystem package of the analysis ICD package 102 is being examined, the ICD standards validation tool 34 determines if the selected subsystem package is the last subsystem package of the analysis ICD package 102 to be examined. If there are additional subsystem packages of the analysis ICD package 102 to be examined, the method proceeds to step 66*w* for selection of a next subsystem package. The method then returns to step 66*g* for further processing in the manner previously described. If, however, a single subsystem package of the analysis ICD package 102 was selected at step 66*b* for examination or if it is determined at step 66*v* that the last subsystem package of the analysis ICD package 102 selected at step 66*b* has been examined, the method proceeds to step 66*x* where the ICD standards validation tool 34 determines that generation of the analysis ICD standards exception report for the selected analysis ICD package 102, or a selected subsystem package, scenario or sequence diagram thereof, is complete. The method then ends at step 66*y*.

Figures 1, 4B:
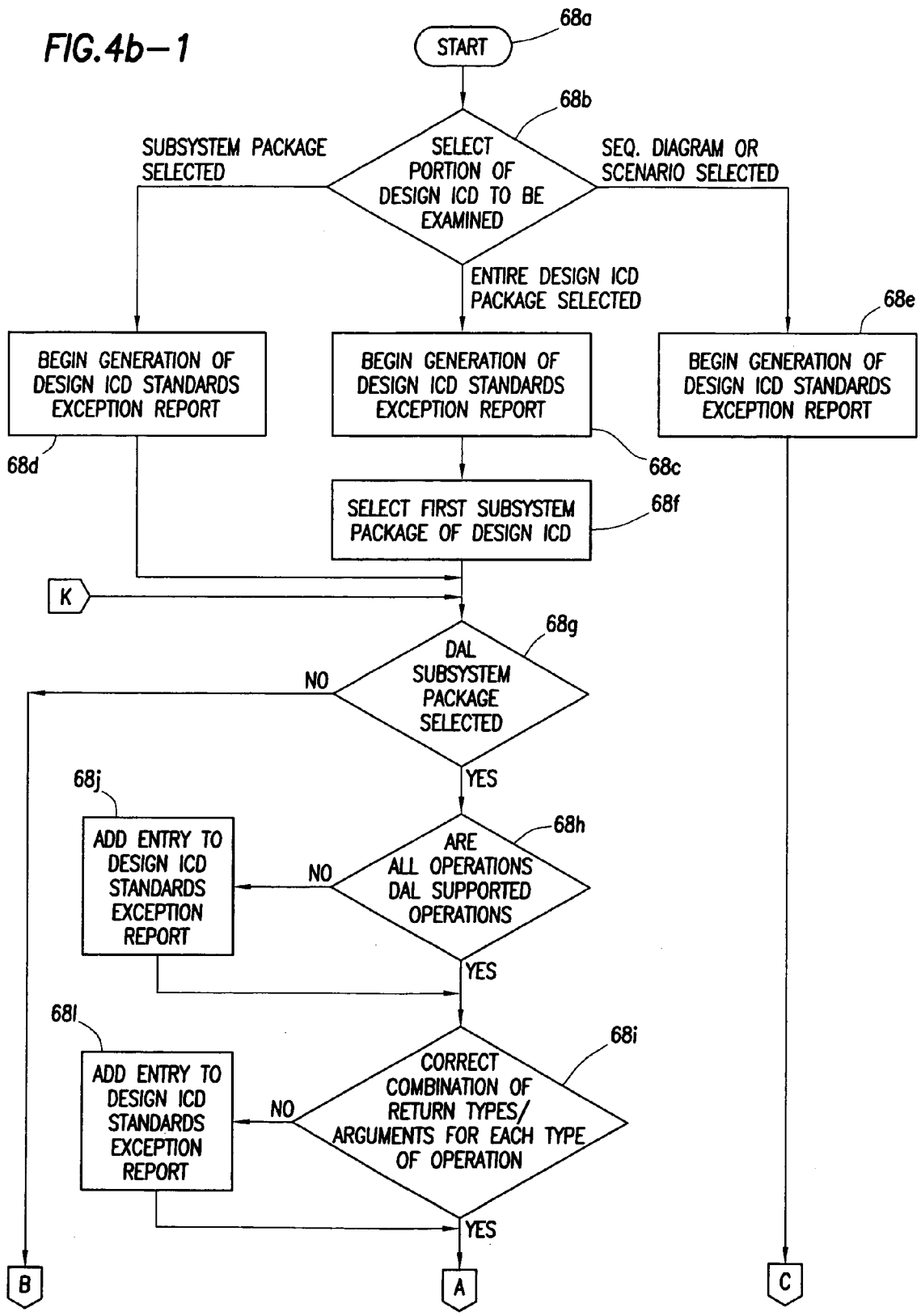
FIG. 4b is an expanded flowchart of a design ICD standards validation function of FIG. 3.
Figures 2, 4B:
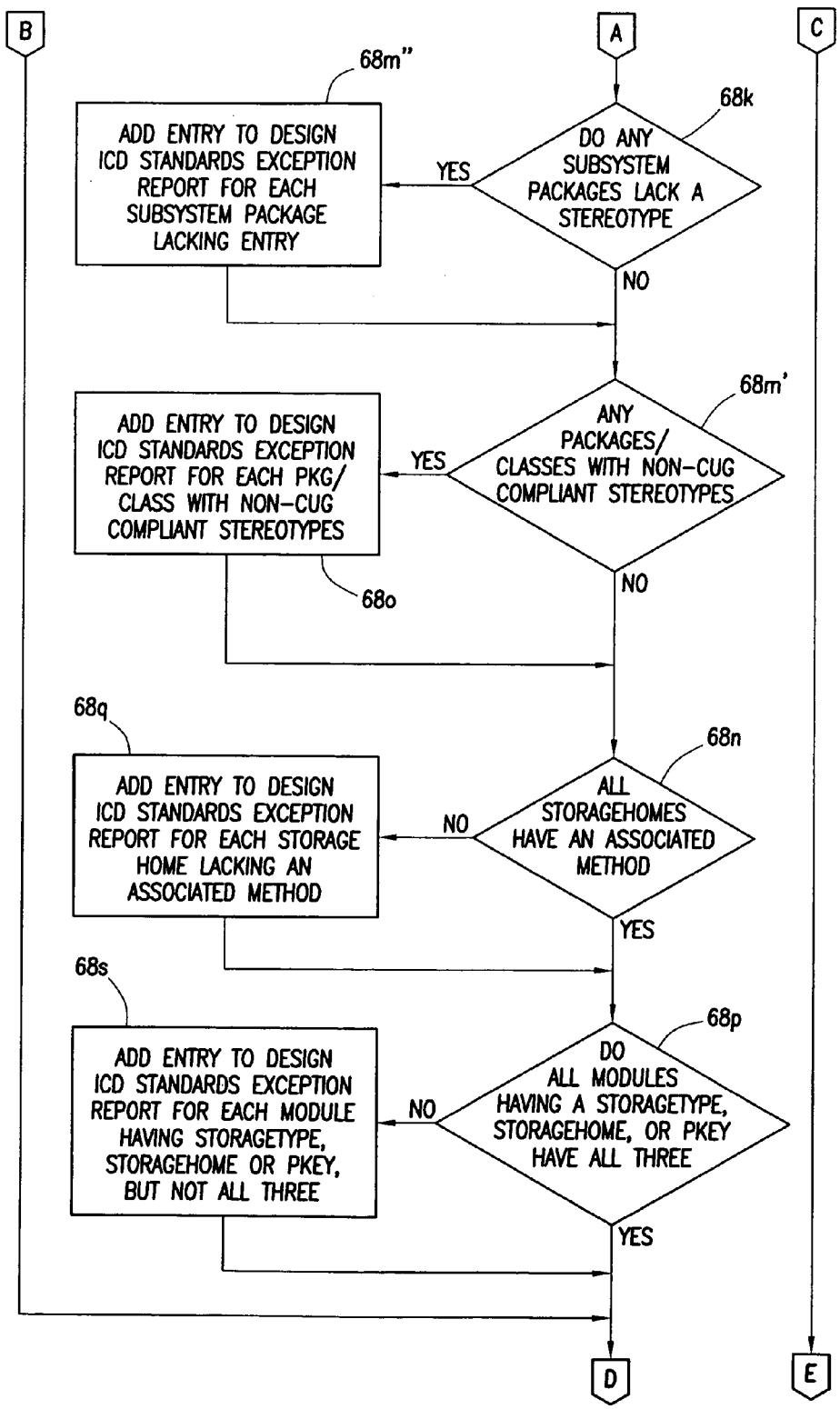
Figures 3, 4B:
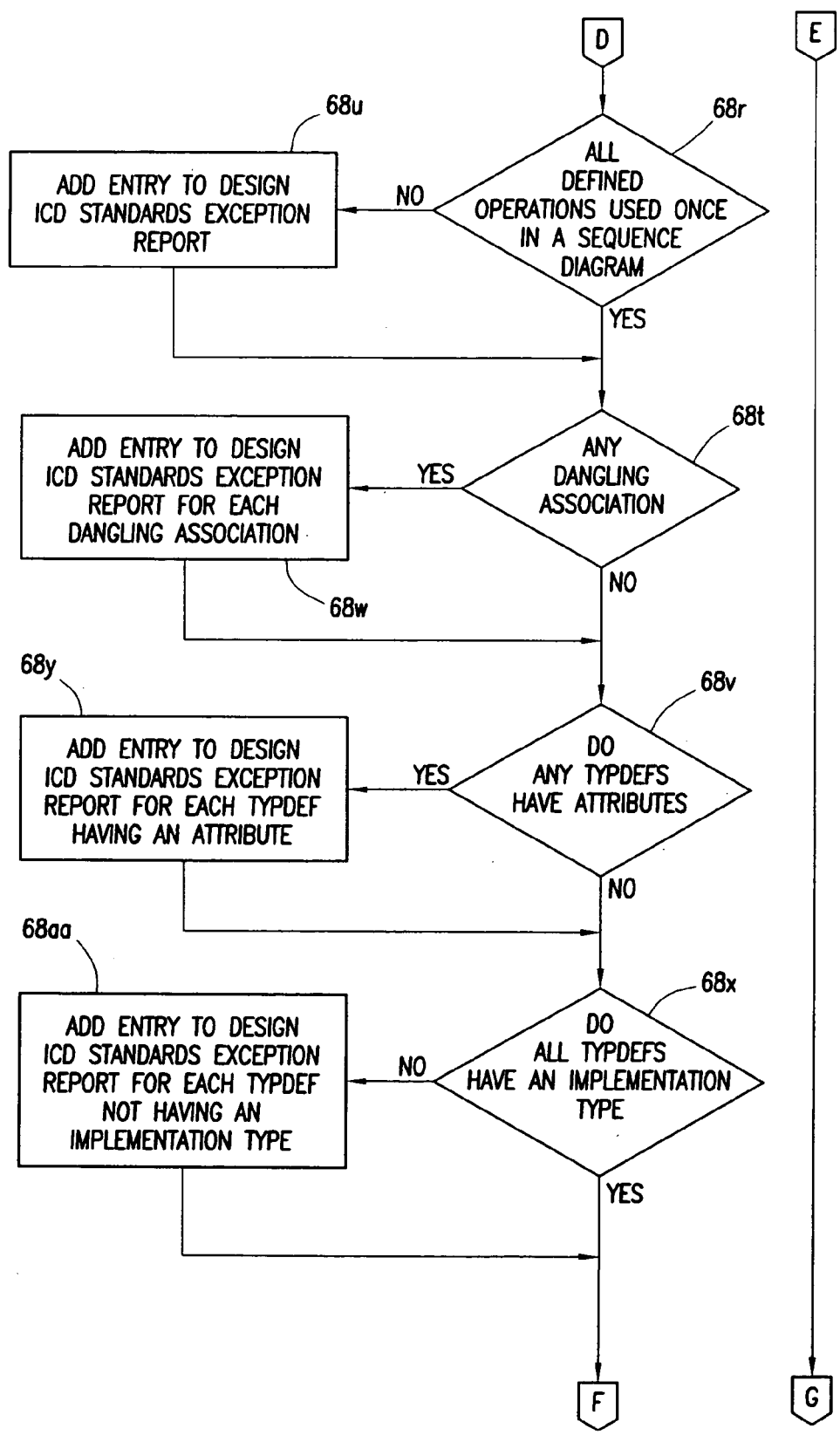
Figures 4, 4B:
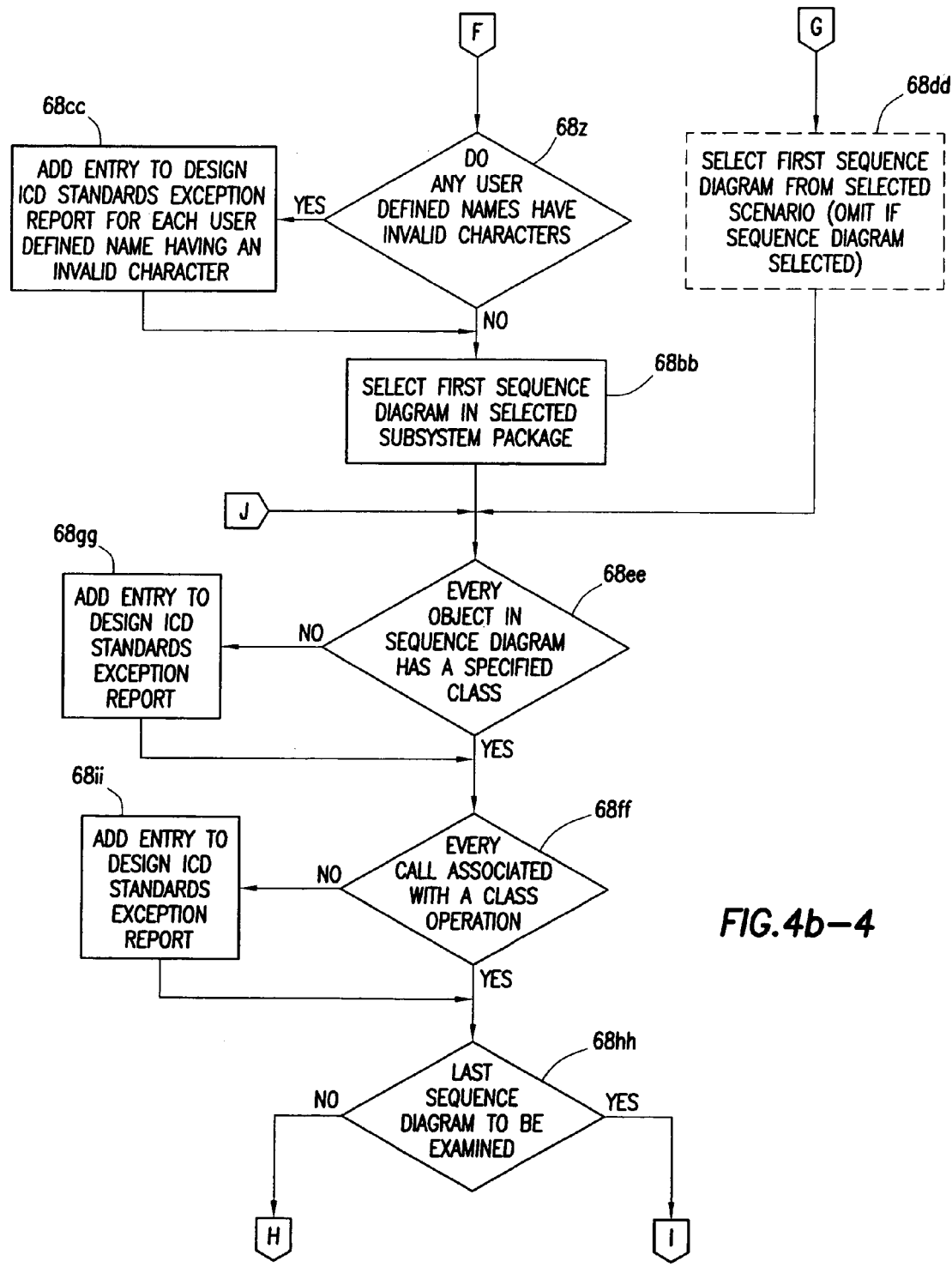
Figures 4, 4B, 5:
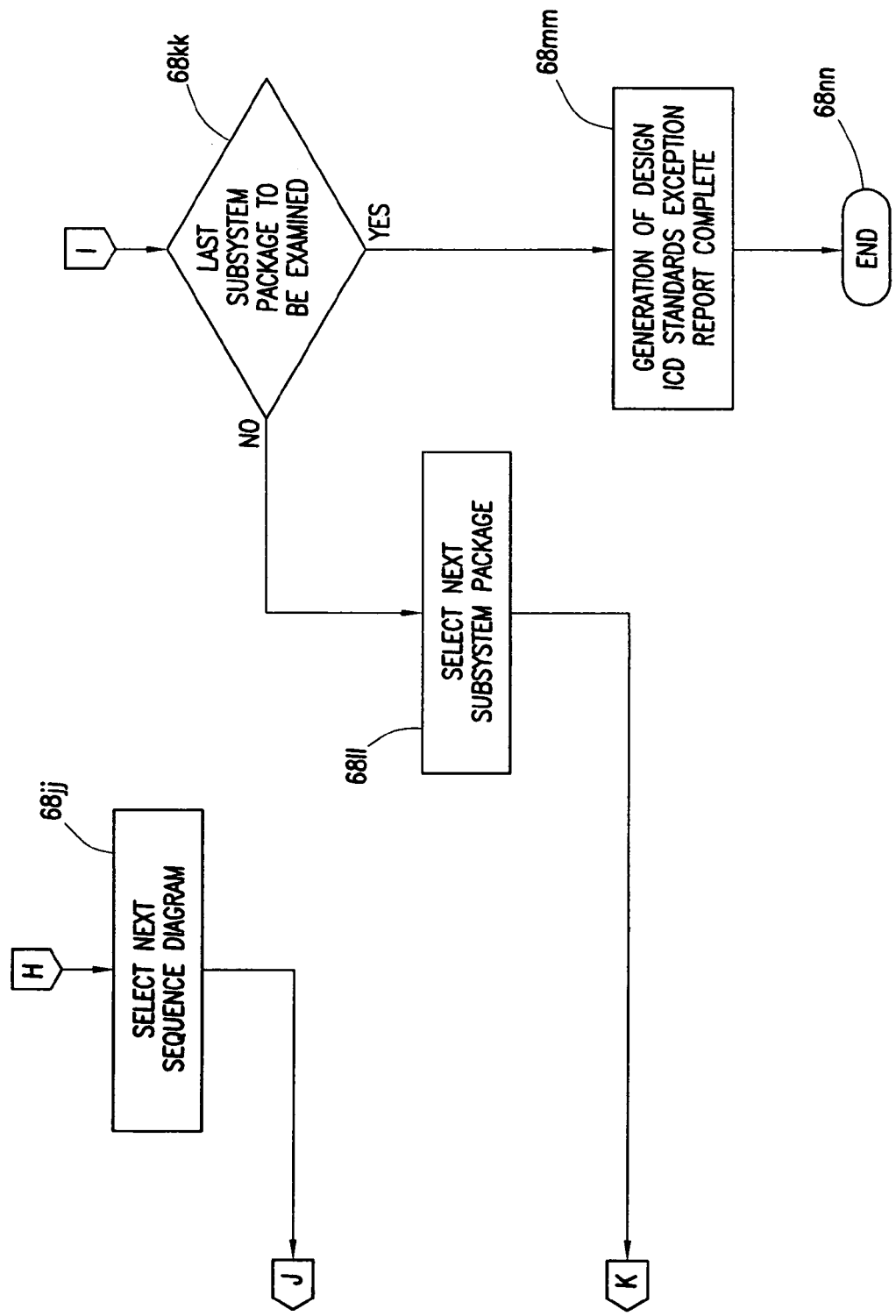
FIG. 5 is an illustration of a model of an integrated enterprise.
Figure 5:
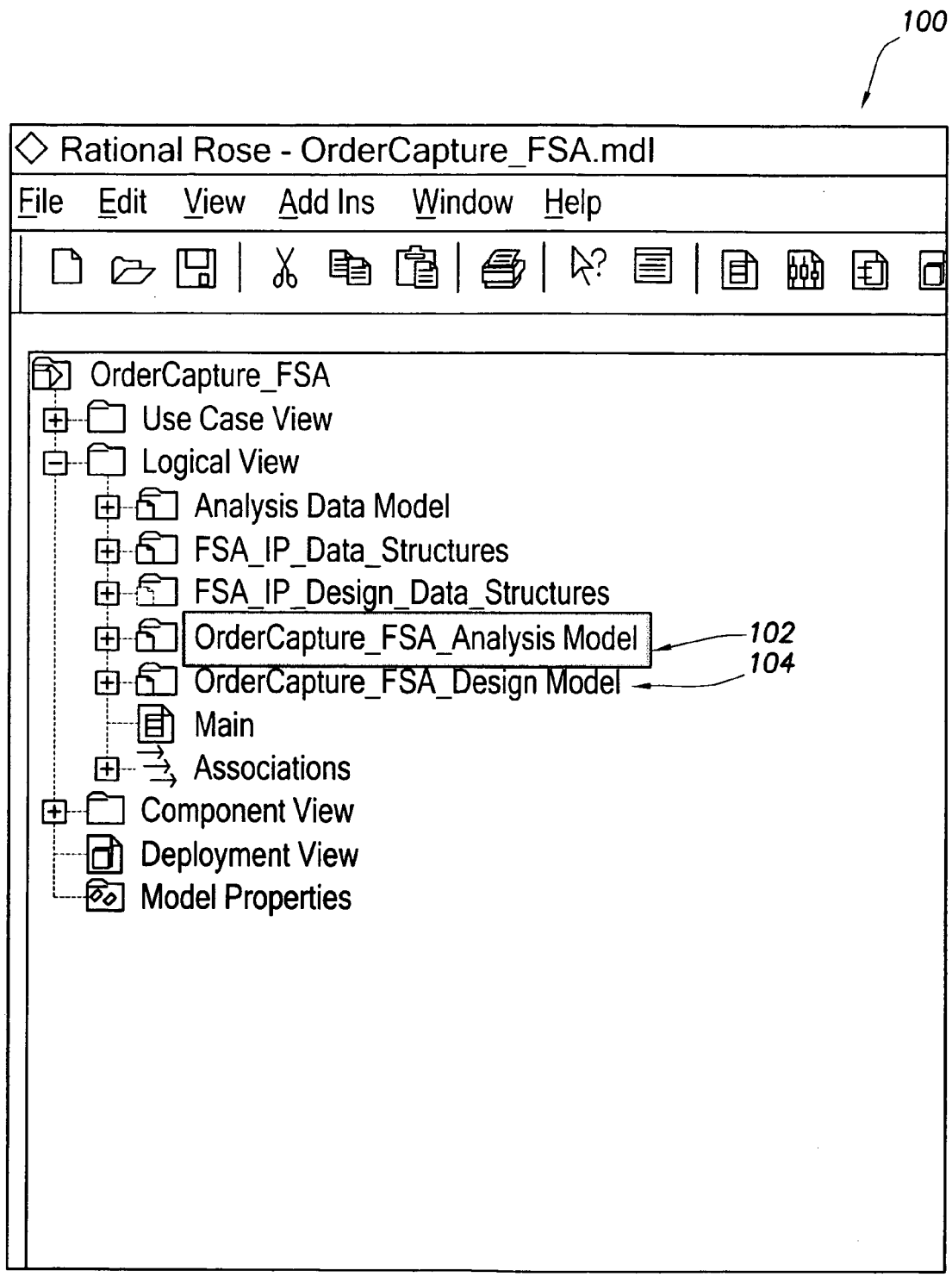

Referring next to FIG. 4*b*, the method by which the design ICD standards validation function is executed at step 68 of FIG. 3 will now be described in greater detail. Prior to describing this method, however, it should be noted that, when modeling an integrated enterprise, a design ICD document is produced using a previously generated analysis ICD document produced for that integrated enterprise. Unlike the analysis ICD document, the design ICD document describes both the basic data elements passed between the various components of an integrated enterprise, as well as the format and order of the elements. Typically, different technologies are use to transfer data between the various components of the integrated enterprise. As a result, the design ICD document must take the standard for each transfer technology into account. For example, as disclosed herein, the design ICD package 104 which models the integrated enterprise 10 uses extensible markup language ("XML"), common object request broker architecture ("CORBA") and message broker ("MB") standards.

In the design ICD package 104, each application of the integrated enterprise being modeled has a subsystem package that contains a class entity for each interface technology used by that subsystem. Each subsystem also requires a processor for sending messages. If an XML interface is used, an HTTP connector is also required. For MB interfaces, a Publisher and Subscriber are also necessary. Each subsystem of the design ICD package 104 contains the same use case realizations as the corresponding subsystem of the analysis ICD package 102. XML interfaces, however, require a document type definition (or "DTD") attached to the operation in the design ICD package 104. CORBA interfaces and data are stored in the DAL subsystem package 120. This package of CORBA interfaces and data is commonly called a module. Each CORBA module must contain a StorageType and a PKey, each having CORBAStruct as its stereotype. Otherwise, these structures will have the same attributes as the corresponding structures in the analysis ICD package 102. Each CORBA module will also have a "StorageHome" and "StorageHomeFactory" interfaces. The StorageHome interface will contain the operations on the sequence diagrams.

The method commences at step 68a and, at step 68b, a portion of a design ICD document, for example, the design ICD package 104, is selected for examination to determine compliance of the selected portion with ICD standards. Variously, it is contemplated that either: (a) the entire design ICD package 104; (b) one or more subsystem packages of the design ICD package 104; (c) a selected scenario comprised of plural sequence diagrams of a selected subsystem package of the design ICD package 104; or (d) a selected sequence diagram of a selected subsystem package of the design ICD package 104 may be selected at step 68b for further examination.

If the entire design ICD package 104 is selected at step 68b for examination, the method proceeds to step 68c where generation of a design ICD standards exception report detailing variations of the design ICD package 104 from the selected ICD standards is commenced. Similarly, if a subsystem package of the design ICD package 104 is selected at step 68b for further examination, the method will instead proceed to step 68d where generation of a design ICD standards exception report detailing variations of the selected subsystem package from the selected ICD standards is commenced. Finally, if a scenario comprised of plural sequence diagrams or a single sequence diagram is selected at step 68b for examination, the method will instead proceed to step 68e where generation of a design ICD standards exception report detailing variations of the selected scenario or sequence diagram from the selected ICD standards is commenced.

Returning to step 68c, upon commencing generation of a design ICD standards exception report for the design ICD package 104, the method will then proceed to step 68f for selection of a first subsystem package of the design ICD package 104 for examination. Like the analysis ICD package 102, it is again contemplated that the various subsystem packages collectively forming the design ICD package 104 may be examined in any order. Accordingly, upon selection at step 68f of a first subsystem package of the design ICD package 104 for examination or upon commencing generation of a design ICD standards exception report for a selected subsystem package at step 68d, the method proceeds to step 68g where it is determined if the selected subsystem package is a DAL subsystem package. If the selected subsystem package is not a DAL subsystem package, the method proceeds to step 68r for further processing in the manner to be more fully described below.

If, however, the selected subsystem package is a DAL subsystem package the method then proceeds to step 68h for determination if all of the operations in the DAL subsystem package are supported. To make this determination, the ICD standards validation tool 34 compares each operation contained in the DAL subsystem package to the DAL supported operations defined in the third portion 154 of the standards configuration file 148. As may be seen in FIG. 8, the DAL supported operations are the CREATE, UPDATE, ACQUIRE, CREATE WITH, FIND BY, FINDBROWSE BY, GET, GETCOUNT, GETDTS, GETITERATOR USING, GETNEXT, ITERATORBASE, RELATE WITH, RELEASE, RELEASEITERATOR, REMOVE BY, REMOVE WITH, UNRELATE WITH, UPDATE VOID and UPDATE WITH while any other operation is not a DAL support operation. Accordingly, if all of the operations contained in the DAL subsystem package match one of the above-listed operations identified in the third portion 154 of the standards configuration file 148, then all of the operations in the DAL subsystem package are supported and the method proceeds to step 68i for further processing. If, however, one or more of the operations contained in the DAL subsystem package does not match an operation contained in the third portion 154 of the standards configuration file 148, those operations are not supported and the method will instead proceed to step 68j where an entry describing each unsupported operation is added to the design ICD standards exception report being constructed.

Proceeding on to step 68i, the ICD standards validation tool 34 next determines if each operation contained in the DAL subsystem package has the correct combination of return types and/or arguments. Here, it should be noted that subsystem interactions in a design model generally fall into one of three categories: IB, CORBA and MB. Interfaces to IB are CORBA interfaces that follow a specific, pre-defined pattern. Other applications may use CORBA to communicate but will not use the standard IB interface for communicating amongst themselves. Finally, many applications will use MB to communicate with one another. MB is a service that provides message delivery and a consistent interface to applications that use it. Both IB and CORBA interfaces require a processor class to communicate. Processor controller classes must be named after their respective sub-systems with the addition of the word "processor". MB event classes should begin with the name of its respective subsystem, followed by either "MB Publisher" or "MB Subscriber". Accordingly, if the ICD standards validation tool 34 determines at step 68i that all of the supported operations forming part of the DAL package have a structure which meets the aforementioned requirements, the method will proceed to step 68k for further processing. If, however, the ICD standards validation tool 34 determines at step 68i that any operations forming part of the DAL package fails to meet these requirements, the method will instead proceed to step 68l where an entry to the design ICD standards exception report is generated for each such variance noted. The method then proceeds to step 68k for further processing.

Proceeding on to step 68k the ICD standards validation tool 34 then determines whether any of the subsystem packages of the DAL subsystem package lack a defined stereotype. To do so, the ICD standards validation tool 34 compares the stereotype of each subsystem package to the list of defined stereotypes contained in the first portion 150 of the system configuration file 148. If each subsystem package has a stereotype contained in the first portion 150 of the system configuration file 148, then the ICD standards validation tool 34 determines at step 68k that all of the subsystem packages forming part of the DAL package have a defined stereotype and the method will proceed to step 68m' for further processing. If, however, the ICD standards validation tool 34 determines at step 68k that one or more of the subsystem packages forming part of the DAL subsystem package fails to have a defined stereotype, the method will instead proceed to step 68m" where an entry to the design ICD standards exception report is generated for each such variance noted. The method then proceeds to step 68*m*' for further processing.

Stereotypes uses in the packages/classes should also be in compliance with the Component Users Guide (or "CUG")—a known coding standard for IB. Proceeding on to step 68*m*', the ICD standards validation tool 34 then checks the subsystem packages/classes of the selected package for non-CUG compliant stereotypes. If the ICD standards validation tool 34 determines at step 68*m*' that all of the subsystem packages/classes for the selected package packages have a CUG-compliant stereotype, the method will proceed to step 68*n* for further processing. If, however, the ICD standards validation tool 34 determines at step 68*m*' that any of the subsystem packages/classes forming part of the selected package fails to have a CUG-compliant stereotype, the method will instead proceed to step 68*o* where an entry to the design ICD standards exception report is generated for each such variance noted. The method then proceeds to step 68*n* for further processing.

StorageHome is an interface which contains the operations depicted on the sequence diagrams. Proceeding to step 68*n*, the ICD standards validation tool 34 determines if each module having a StorageHome interface also has an operation associated therewith. If all such modules have an operation associated therewith, the method proceeds to step 68*p* for further processing. If, however, the ICD standards validation tool 34 determines at step 68*n* that any of the modules having a StorageHome interface does not have an operation associated therewith, the method will instead proceed to step 68*q* where an entry to the design ICD standards exception report is generated for each such variance noted. The method then proceeds to step 68*p* for further processing.

As previously set fourth, StorageHome is an interface which contain the operations depicted on the sequence diagrams. Data sent to or returned from the IB must include a StorageType. PKey would indicate that the structure is a primary key. At step 68*p*, the ICD standards validation tool 34 checks to see that all modules having a StorageType, StorageHome or PKey have all three. If all modules having one of these three also have the remaining two, the method proceeds to step 68*r* for further processing. If, however, the ICD standards validation tool 34 determines at step 68*p* that any of the modules having one of the three does not also have the other two, the method will instead proceed to step 68*s* where an entry to the design ICD standards exception report is generated for each such variance noted. The method then proceeds to step 68*r* for further processing.

Upon either: (a) determining, at step 68*p*, that all modules having one of StorageType, StorageHome or PKey have all three; (b) generating, at step 68*s*, an entry to the design ICD standards exception report for each module having one but not all of StorageType, StorageHome and PKey; or (3) determining, at step 68*g*, that the selected package is not a DAL subsystem package, the method proceeds to step 68*r* for determination, by the ICD standards validation tool 34, whether all of the operations of the selected subsystem package are used in a sequence diagram which depicts the operation. If all of the operations forming part of the selected package are used in a sequence diagram which, in whole or part, depicts that operation, the method proceeds to step 68*t* for further processing. If, however, one or more of the operations forming part of the selected package are not used in a sequence diagram which, in whole or part, depicts that operation, the method will instead proceed to step 68*u* where an additional entry for the design ICD standards exceptions report is generated for each such operation failing to be used in a sequence diagram. The method would then proceed to step 68*t* for further processing.

Proceeding on to step 68*t*, the ICD standards validation tool 34 shall next determine whether there any dangling associations in the design ICD package 104. When the Rational Rose software application is used as the UML modeling tool 32, the functionality used to identify dangling associations within the design ICD package 104 is provided by the Rational Rose software. Accordingly, further description of this functionality is not deemed necessary for an understanding of the invention. If no dangling associations are identified within the design ICD package 104 by the ICD standards validation tool 34, the method proceeds to step 68*v* for further processing. If, however, dangling associations are identified within the design ICD package 104 by the ICD standards validation tool 34, the method will instead proceed to step 68*w* where, for each identified dangling association, an entry is added to the design ICD standards exception report under construction.

In order to ensure that the CORBA specification is modeled correctly, Typedefs must have an implementation type and must not have any attributes associated therewith. At step 68*v*, the ICD standards validation tool 34 determines if any Typedefs have attributes associated therewith. If there are no attributes associated with any Typedefs, the method proceeds to step 68*x* for further processing. If, however, the ICD standards validation tool 34 identifies attributes associated with Typedefs, the method proceeds to step 68*y* where an entry in the design ICD standards exception report is generated for each identified Typedef having an attribute associated therewith. The method then continues on to step 68*x* for further processing. At step 68*x*, the ICD standards validation tool 34 determines whether all of the Typedefs have an implementation type. If all of the Typedefs have an implementation type, the method proceeds to step 68*z* for further processing. If one or more of the Typedefs lack an implementation type, the method will instead proceed to step 68*aa* where an entry is added to the design ICD standards exception report for each Typedef lacking an implementation type. The method will then proceed to step 68*z* for further processing.

At step 68*z*, the ICD standards validation tool 34 determines if any of the user-defined names contained in the design ICD package 104 uses invalid characters. To make this determination, each name is checked against the list of invalid characters contained in the second portion 152 of the standards configuration file 148. If any of the user-defined names use an invalid character, the method proceeds to step 68*cc* where an entry is added for each user-defined name using an invalid character. Upon the ICD standards validation tool 34 determining, at step 68*z*, that no user-defined name users an invalid character or upon the ICD standards validation tool 34 generating an entry in the design ICD standards exception report for each user-defined name incorporating therein an invalid character, the method continues on to step 68*bb* for further processing.

At step 68*bb*, a first sequence diagram from the selected subsystem package of the design ICD package 104 is selected for further examination. Upon selection of a first sequence diagram at step 68*bb* or if either a single sequence diagram was selected at step 68*b* for further examination or a scenario comprised of plural sequence diagrams was selected at step 68*b* for further examination and a first sequence diagram from the selected scenario was selected at step 68*dd*, the method proceeds to step 68*ee* where the IDS standards validation tool 34 determines if every object in the selected sequence diagram has a specified class. If every object in the selected sequence diagram has a specified class, the method proceeds to step 68ff for further processing. If, however, one or more of the objects in the selected sequence diagram does not have a specified class, the method will instead proceed to step 68gg where an entry for the design ICD standards exception report is generated for each such variance. The method would then proceed to step 68ff for further processing. Proceeding on to step 68ff, the ICD standards validation tool 34 then determines if every call contained in the selected sequence diagram is associated with a class operation. If every call in the selected sequence diagram is associated with a class operation, the method proceeds to step 68hh for further processing. If, however, one or more of the calls in the selected sequence diagram is not associated with a class operation, the method will instead proceed to step 68ii where an entry for the design ICD standards exception report is generated for each such variance. The method would then proceed to step 68hh for further processing.

Proceeding on to step 68hh, the ICD standards validation tool 34 determines whether the selected sequence diagram is the last sequence diagram of the scenario or subsystem package being examined. If it is determined that there are additional sequence diagrams in the scenario or subsystem package of the design ICD package 104 being examined, the method proceeds to step 68jj for selection of a next sequence diagram of the selected scenario or subsystem package of the design ICD package 104. The method then returns to step 68ee for further processing of the newly selected sequence diagram in the manner previously described. If, on the other hand, it is determined at step 68hh that the selected sequence diagram is the last sequence diagram of the selected scenario or subsystem package of the design ICD package 104 being examined, the method proceeds to step 68kk where, if a subsystem package of the design ICD package 104 is being examined, the ICD standards validation tool 34 determines if the selected subsystem package is the last subsystem package of the design ICD package 104 to be examined. If there are additional subsystem packages of the design ICD package 104 to be examined, the method proceeds to step 68ll for selection of a next subsystem package. The method then returns to step 68g for further processing in the manner previously described. If, however, a single subsystem package of the design ICD package 104 was selected at step 68b for examination or if it is determined at step 68kk that the last subsystem package of the design ICD package 104 selected at step 68b has been examined, the method proceeds to step 68mm where the ICD standards validation tool 34 determines that generation of the design ICD standards exception report for the selected design ICD package 104, or a selected subsystem package, scenario or sequence diagram thereof, is complete. The method then ends at step 68nn.

Thus, there has been described and illustrated herein, an ICD standards validation tool suitable for use in enterprise architecture modeling. By analyzing a model to determine its compliance with a previously determined set of standards, the modeling standards validation tool may be used to identify errors occurring during construction of the model. However, those skilled in the art should recognize that numerous modifications and variations may be made in the techniques disclosed herein without departing substantially from the spirit and scope of the invention. Accordingly, the scope of the invention should only be defined by the claims appended hereto.

What is claimed is:

1. For an integrated enterprise having at least two applications and a database shared between said at least two applications, a method of establishing compliance of a model of said integrated enterprise with a set of standards by modeling the interface of call structures between said at least two applications and said shared database, comprising:
    analyzing a plurality of modeled calls between said at least two applications and said shared database such that an exception exists between said model of said integrated enterprise and said set of standards for each data attribute error in application-to-database modeled calls or application-to-application modeled calls;
    identifying exceptions between said model of said integrated enterprise and said set of standards;
    if no exceptions between said model of said integrated enterprise and said set of standards are identified, determining that said model of said integrated enterprise is in compliance with said set of standards; and
    if one or more exceptions between said model of said integrated enterprise and said set of standards are identified, revising said model of said integrated enterprise to correct said identified exceptions and storing said revised model on a computer readable medium.

2. The method of claim 1, wherein said model of said integrated enterprise includes an analysis ICD and wherein identifying exceptions between said model of said integrated enterprise and said set of standards further comprises identifying exceptions between said analysis ICD of said model of said integrated enterprise and said set of standards.

3. The method of claim 2 and further comprising:
    generating, if one or more exceptions between said analysis ICD of said model of said integrated enterprise and said set of standards are identified, a report listing said identified exceptions;
    wherein said analysis ICD of said model of said integrated enterprise is revised using said report listing said identified exceptions.

4. The method of claim 1, wherein said model of said integrated enterprise includes a design ICD and wherein identifying exceptions between said model of said integrated enterprise and said set of standards further comprises identifying exceptions between said design ICD of said model of said integrated enterprise and said set of standards.

5. The method of claim 4 and further comprising:
    generating, if one or more exceptions between said design ICD of said model of said integrated enterprise and said set of standards are identified, a report listing said identified exceptions;
    wherein said design ICD of said model of said integrated enterprise is revised using said report listing said identified exceptions.

6. The method of claim 1, wherein said model of said integrated enterprise includes an analysis ICD and a design ICD and wherein identifying exceptions between said model of said integrated enterprise and said set of standards further comprises:
    identifying exceptions between said analysis ICD of said model of said integrated enterprise and said set of standards; and
    identifying exceptions between said design ICD of said model of said integrated enterprise and said set of standards.

7. The method of claim 6 and further comprising:
    generating, if one or more exceptions between said analysis ICD of said model of said integrated enterprise and said set of standards are identified, a first report listing said exceptions identified for said analysis ICD; and generating, if one or more exceptions between said design ICD of said model of said integrated enterprise and said set of standards are identified, a second report listing said exceptions identified for said design ICD;

wherein said analysis ICD of said model of said integrated enterprise is revised using said first report and said design ICD of said model of said integrated enterprise is revised using said second report.

8. The method of claim 1, wherein said at least two applications access said shared database through a data access layer and further comprising:

identifying, within said model of said integrated enterprise, operations interfacing said data access layer with one of said at least two applications; and identifying an exception for each one of said identified operations which are not supported by said set of standards.

9. The method of claim 8, wherein said set of standards support CREATE, RETRIEVE, UPDATE and DELETE operations.

10. The method of claim 9, and further comprising:

identifying an exception for each CREATE, UPDATE or return from a RETRIEVE operation lacking a storage type; and identifying an exception for each RETRIEVE or DELETE operation lacking a key.

11. The method of claim 10, wherein said model of said integrated enterprise includes at least one sequence diagram and further comprising:

identifying an exception for each operation not used at least once in said at least one sequence diagram.

12. The method of claim 11, wherein each of said at least one sequence diagrams includes at least one call comprised of an object and a message and further comprising:

identifying an exception for each object of a call not associated with one of said at least two applications; and identifying an exception for each message of a call not associated with an operation.

13. The method of claim 1, and further comprising:

identifying, within said model of said integrated enterprise, operations interfacing a first one of said at least two applications and a second one of said at least two applications; and identifying an exception for each operation not used at least once in at least one sequence diagram depicting said operation.

14. The method of claim 1, wherein said at least two applications access said shared database through a data access layer and further comprising:

identifying a first data access layer package, said first data access layer package detailing the interface between said at least two applications and said data access layer;

identifying at least one subsystem package, said at least one subsystem package detailing interfaces between said at least two applications;

identifying exceptions within said first data access layer package by applying a first set of rules to said first data access layer package and identifying an exception for each violation, by said first data access layer package, of said first set of rules; and identifying exceptions within said at least one subsystem package by applying a second set of rules to said at least one subsystem package and identifying an exception for each violation, by said at least one subsystem package, of said second set of rules.

15. The method of claim 14, wherein said second set of rules is a subset of said first set of rules.

16. The method of claim 15, and further comprising:

identifying a second data access layer package, said second data access layer package detailing the interface between said at least two applications and said shared database; and identifying exceptions within said second data access layer package by applying a third set of rules to said second data access layer package and identifying an exception for each violation, by said second data access layer package of said third set of rules.

17. A device for validating a model of an integrated enterprise, said integrated enterprise having first and second applications and a shared database, said device comprising:

a unified modeling language ("UML") tool for constructing a model of said integrated enterprise by modeling the interface of call structures between said at least two applications and said shared database; and a tool for analyzing said model of said integrated enterprise, said tool identifying exceptions between said model of said integrated enterprise and a set of standards, and storing said exceptions on a computer readable medium;

wherein an exception exists between said model of said integrated enterprise and said set of standards for each data attribute error in application-to-database modeled calls or application-to-application modeled calls.

18. The device of claim 17, wherein said model analyzing tool generates a standard exception report identifying violations, by said model, of said set of standards.

19. The device of claim 17, wherein said tool comprises:

memory means for storing a selected portion of said set of standards; and processor means for comparing said model of said integrated enterprise to said selected portion of said set of standards stored in said memory means.

20. The device of claim 17, wherein said model includes first and second interface control documents, said first interface control document detailing the interface between said at least two applications and a data access layer of said integrated enterprise and said second interface control document detailing the interface between said at least two applications and said shared database and wherein said memory means includes a first memory area in which a first subset of said selected portion of said set of standards to be applied against said first interface control document are stored and a second memory area in which a second subset of said selected portion of said set of standards to be applied against said second interface control document are stored.

* * * * *